US012100207B2

(12) United States Patent
Wang et al.

(10) Patent No.: US 12,100,207 B2
(45) Date of Patent: *Sep. 24, 2024

(54) 3D OBJECT ANNOTATION

(71) Applicant: Magic Leap, Inc., Plantation, FL (US)

(72) Inventors: Yingnan Wang, Plantation, FL (US); Paulo William Cardoso Maciel, Boca Raton, FL (US); Raul Fernandez Hernandez, Sunrise, FL (US); Cole Parker Heiner, Fort Lauderdale, FL (US); Richard St. Clair Bailey, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/887,255

(22) Filed: Aug. 12, 2022

(65) Prior Publication Data

US 2022/0383634 A1 Dec. 1, 2022

Related U.S. Application Data

(63) Continuation of application No. 17/174,141, filed on Feb. 11, 2021, now Pat. No. 11,763,559.
(Continued)

(51) Int. Cl.
G06V 20/20 (2022.01)
G02B 27/01 (2006.01)
G06T 19/00 (2011.01)

(52) U.S. Cl.
CPC .......... *G06V 20/20* (2022.01); *G02B 27/017* (2013.01); *G06T 19/006* (2013.01); *G02B 2027/0178* (2013.01)

(58) Field of Classification Search
None
See application file for complete search history.

(56) References Cited

U.S. PATENT DOCUMENTS 4,852,988 A 8/1989 Velez
6,130,670 A 10/2000 Porter
(Continued)

FOREIGN PATENT DOCUMENTS

CA 2316473 A1 1/2001
CA 2362895 A1 12/2002
(Continued)

OTHER PUBLICATIONS

Non-Final Office Action mailed Jan. 16, 2024, for U.S. Appl. No. 17/723,245, filed Apr. 18, 2022, twenty pages.
(Continued)

*Primary Examiner* — Yingchun He
(74) *Attorney, Agent, or Firm* — Morrison & Foerster LLP

(57) ABSTRACT

Disclosed herein are systems and methods for presenting and annotating virtual content. According to an example method, a virtual object is presented to a first user at a first position via a transmissive display of a wearable device. A first input is received from the first user. In response to receiving the first input, a virtual annotation is presented at a first displacement from the first position. A first data is transmitted to a second user, the first data associated with the virtual annotation and the first displacement. A second input is received from the second user. In response to receiving the second input, the virtual annotation is presented to the first user at a second displacement from the first position. Second data is transmitted to a remote server, the second data associated with the virtual object, the virtual annotation, the second displacement, and the first position.

20 Claims, 16 Drawing Sheets

Related U.S. Application Data

(60) Provisional application No. 62/977,073, filed on Feb. 14, 2020.

(56) References Cited

U.S. PATENT DOCUMENTS

| | | |
|---|---|---|
| 6,433,760 B1 | 8/2002 | Vaissie |
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,290,216 B1 | 10/2007 | Kawahara et al. |
| 7,347,551 B2 | 3/2008 | Fergason et al. |
| 7,488,294 B2 | 2/2009 | Torch |
| 7,800,614 B2 | 9/2010 | Johnson et al. |
| 8,235,529 B1 | 8/2012 | Raffle |
| 8,253,730 B1 | 8/2012 | Carr |
| 8,275,031 B2 | 9/2012 | Neuman |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,069,554 B2 | 6/2015 | Lioy et al. |
| 9,274,338 B2 | 3/2016 | Robbins et al. |
| 9,292,973 B2 | 3/2016 | Bar-zeev et al. |
| 9,323,325 B2 | 4/2016 | Perez et al. |
| 9,720,505 B2 | 8/2017 | Gribetz et al. |
| 9,811,237 B2 | 11/2017 | Schileru |
| 10,013,053 B2 | 7/2018 | Cederlund et al. |
| 10,025,379 B2 | 7/2018 | Drake et al. |
| 10,528,349 B2 | 1/2020 | Kumar |
| 10,977,858 B2 | 4/2021 | Babu Jd |
| 10,977,868 B2 | 4/2021 | Neeter |
| 11,017,592 B2 | 5/2021 | Babu J D |
| 11,201,953 B2 | 12/2021 | Babu J D et al. |
| 11,295,518 B2 | 4/2022 | Babu J D |
| 11,315,316 B2 | 4/2022 | Babu J D |
| 11,335,070 B2 | 5/2022 | Baier et al. |
| 11,475,644 B2 | 10/2022 | Bailey et al. |
| 11,494,528 B2 | 11/2022 | Bailey et al. |
| 11,699,262 B2 | 7/2023 | Babu J D |
| 11,763,559 B2 | 9/2023 | Wang et al. |
| 11,797,720 B2 | 10/2023 | Bailey et al. |
| 11,861,803 B2 | 1/2024 | Bailey et al. |
| 11,936,733 B2 | 3/2024 | Babu J D et al. |
| 2001/0012018 A1 | 8/2001 | Hayhurst |
| 2002/0163515 A1 | 11/2002 | Sowizral et al. |
| 2002/0172328 A1 | 11/2002 | Dekel |
| 2003/0030597 A1 | 2/2003 | Geist |
| 2003/0076329 A1 | 4/2003 | Beda et al. |
| 2004/0130550 A1 | 7/2004 | Blanco et al. |
| 2004/0130552 A1 | 7/2004 | Duluk et al. |
| 2004/0130579 A1 | 7/2004 | Ishii |
| 2004/0189669 A1 | 9/2004 | David et al. |
| 2005/0182844 A1 | 8/2005 | Johnson |
| 2006/0023158 A1 | 2/2006 | Howell et al. |
| 2006/0122819 A1 | 6/2006 | Carmel et al. |
| 2007/0057952 A1 | 3/2007 | Swedberg et al. |
| 2007/0220168 A1 | 9/2007 | Parsons et al. |
| 2008/0002761 A1 | 1/2008 | Edsall et al. |
| 2008/0122838 A1 | 5/2008 | Hoover et al. |
| 2009/0278852 A1 | 11/2009 | Reese et al. |
| 2009/0282369 A1 | 11/2009 | Jones |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0075343 A1 | 3/2012 | Chen et al. |
| 2012/0249416 A1 | 10/2012 | Maciocci et al. |
| 2013/0012418 A1 | 1/2013 | Tatsumi |
| 2013/0073707 A1 | 3/2013 | Butler et al. |
| 2013/0077147 A1 | 3/2013 | Efimov |
| 2013/0120418 A1 | 5/2013 | Green et al. |
| 2013/0120421 A1 | 5/2013 | Maguire |
| 2013/0127849 A1 | 5/2013 | Marketsmueller et al. |
| 2013/0293468 A1 | 11/2013 | Perez et al. |
| 2013/0324245 A1 | 12/2013 | Harvey et al. |
| 2014/0123184 A1 | 5/2014 | Reisman |
| 2014/0168218 A1 | 6/2014 | Mitrea et al. |
| 2014/0195918 A1 | 7/2014 | Friedlander |
| 2014/0267234 A1 | 9/2014 | Hook et al. |
| 2014/0267291 A1 | 9/2014 | Smyth et al. |
| 2014/0313197 A1 | 10/2014 | Peuhkurinen |
| 2015/0168731 A1 | 6/2015 | Robbins |
| 2015/0199788 A1 | 7/2015 | Wolfe |
| 2015/0248779 A1 | 9/2015 | Lindquist |
| 2016/0072716 A1 | 3/2016 | Chow et al. |
| 2016/0093090 A1 | 3/2016 | Shin et al. |
| 2016/0104452 A1 | 4/2016 | Guan et al. |
| 2016/0293133 A1 | 10/2016 | Dutt |
| 2016/0343164 A1 | 11/2016 | Urbach |
| 2017/0153926 A1 | 6/2017 | Callegari et al. |
| 2017/0236320 A1 | 8/2017 | Gribetz |
| 2017/0352196 A1* | 12/2017 | Chen ............... G06T 11/00 |
| 2017/0365086 A1 | 12/2017 | Floyd et al. |
| 2018/0114368 A1 | 4/2018 | Marketsmueller |
| 2018/0181198 A1 | 6/2018 | Trotta |
| 2018/0197340 A1 | 7/2018 | Loberg et al. |
| 2018/0197341 A1 | 7/2018 | Loberg et al. |
| 2018/0321894 A1 | 11/2018 | Paulovich et al. |
| 2019/0019348 A1 | 1/2019 | Yamamoto et al. |
| 2019/0114802 A1 | 4/2019 | Lazarow |
| 2019/0180506 A1* | 6/2019 | Gebbie ............... G06T 19/00 |
| 2019/0244426 A1 | 8/2019 | Knoppert et al. |
| 2019/0272674 A1 | 9/2019 | Comer et al. |
| 2019/0392640 A1 | 12/2019 | Qian et al. |
| 2020/0005538 A1 | 1/2020 | Neeter |
| 2020/0051328 A1 | 2/2020 | Mohan et al. |
| 2020/0051337 A1 | 2/2020 | Reynolds et al. |
| 2020/0160601 A1 | 5/2020 | Shreve et al. |
| 2020/0225904 A1 | 7/2020 | Cooper et al. |
| 2021/0256175 A1 | 8/2021 | Bailey et al. |
| 2021/0256261 A1 | 8/2021 | Wang et al. |
| 2021/0256769 A1 | 8/2021 | Bailey et al. |
| 2022/0070278 A1 | 3/2022 | Babu J D et al. |
| 2022/0245905 A1 | 8/2022 | Baier et al. |
| 2023/0014150 A1 | 1/2023 | Bailey et al. |
| 2023/0017752 A1 | 1/2023 | Bailey et al. |
| 2023/0360324 A1 | 11/2023 | Babu J D |
| 2024/0005050 A1 | 1/2024 | Bailey et al. |
| 2024/0087261 A1 | 3/2024 | Bailey |
| 2024/0187488 A1 | 6/2024 | Babu J D |

FOREIGN PATENT DOCUMENTS

| | | |
|---|---|---|
| CA | 2388766 A1 | 12/2003 |
| CN | 103023872 A | 4/2013 |
| CN | 110352085 A | 10/2019 |
| CN | 110476188 A | 11/2019 |
| JP | 2003228721 A | 8/2003 |
| JP | 2004272928 A | 9/2004 |
| JP | 2012503811 A | 2/2012 |
| KR | 20140136367 A | 11/2014 |
| WO | 2010035141 A2 | 4/2010 |
| WO | 2016028293 A1 | 2/2016 |
| WO | 2016198346 A1 | 12/2016 |
| WO | 2018106735 A1 | 6/2018 |
| WO | 2018165039 A1 | 9/2018 |
| WO | 2018175335 A1 | 9/2018 |
| WO | 2018183778 A1 | 10/2018 |
| WO | 2018224847 A2 | 12/2018 |
| WO | 2019074771 A1 | 4/2019 |
| WO | 2019199569 A1 | 10/2019 |
| WO | 2021163224 A1 | 8/2021 |
| WO | 2021163373 A1 | 8/2021 |
| WO | 2021163624 A1 | 8/2021 |
| WO | 2021163626 A1 | 8/2021 |

OTHER PUBLICATIONS

Notice of Allowance mailed Jan. 16, 2024, for U.S. Appl. No. 17/521,740, filed Nov. 8, 2021, seven pages.

Chinese Office Action dated Mar. 29, 2023, for CN Application No. 202180028410.5, with English translation, 12 pages.

(56) References Cited

OTHER PUBLICATIONS

Chinese Office Action dated May 13, 2023, for CN Application No. 202180028398.8, with English translation, 6 pages.
European Communication dated Jan. 20, 2023, for EP Application No. 19841636.4, filed Jul. 22, 2019, six pages.
Non-Final Office Action mailed Mar. 20, 2023, for U.S. Appl. No. 17/723,245, filed Apr. 18, 2022, sixteen pages.
Non-Final Office Action mailed Mar. 29, 2023, for U.S. Appl. No. 17/949,989, filed Sep. 21, 2022, ten pages.
Chinese Office Action dated Oct. 3, 2023, for CN Application No. 202180028410.5, with English translation, 11 pages.
Final Office Action mailed Sep. 29, 2023, for U.S. Appl. No. 17/723,245, filed Apr. 18, 2022, nineteen pages.
Notice of Allowance mailed Oct. 16, 2023, for U.S. Appl. No. 17/944,079, filed Sep. 13, 2022, eight pages.
Non-Final Office Action mailed Jul. 5, 2023, for U.S. Appl. No. 17/944,079, filed Sep. 13, 2022, fourteen pages.
Notice of Allowance mailed Jul. 21, 2023, for U.S. Appl. No. 17/174,141, filed Feb. 11, 2021, seven pages.
Notice of Allowance mailed Jul. 26, 2023, for U.S. Appl. No. 17/949,989, filed Sep. 21, 2022, five pages.
Extended European Search Report dated Jun. 12, 2023, for EP Application No. 21753609.3, nine pages.
Extended European Search Report dated Jun. 9, 2023, for EP Application No. 21753843.8, nine pages.
Chinese Notice of Allowance dated Nov. 13, 2023, for CN Application No. 202180028398.8, with English translation, 4 pages.
International Preliminary Report on Patentability and Written Opinion mailed Aug. 25, 2022, for PCT Application No. PCT/US2021/017508, filed Feb. 10, 2021, nine pages.
International Preliminary Report on Patentability and Written Opinion mailed Aug. 25, 2022, for PCT Application No. PCT/US2021/017718, filed Feb. 11, 2021, seven pages.
International Preliminary Report on Patentability and Written Opinion mailed Aug. 25, 2022, for PCT Application No. PCT/US2021/018035, filed Feb. 12, 2021, 8 pages.
International Preliminary Report on Patentability and Written Opinion mailed Aug. 25, 2022, for PCT Application No. PCT/US2021/018037, filed Feb. 12, 2021, nine pages.
International Search Report mailed Apr. 22, 2021, for PCT Application No. PCT/US2021/017718, filed Feb. 11, 2021, two pages.
Jacob, R. "Eye Tracking in Advanced Interface Design", Virtual Environments and Advanced Interface Design, Oxford University Press, Inc. (Jun. 1995).
Notice of Allowance mailed Aug. 26, 2022, for U.S. Appl. No. 17/175,467, filed Feb. 12, 2021, eight pages.
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Extended European Search Report dated Jun. 30, 2023, for EP Application No. 21753304.1, nine pages.
Japanese Office Action mailed Jul. 27, 2023, for JP Application No. 2021-503735, with English translation, 13 pages.
Non-Final Office Action mailed Aug. 17, 2023, for U.S. Appl. No. 17/521,740, filed Nov. 8, 2021, fourteen pages.
Schmalstieg, D. et al., (2002). "Distributed Applications for Collaborative Augmented Reality", Proceedings IEEE Virtual Reality 2002 [online], US, IEEE, Mar. 24, 2002, pp. 1-8, URL: https://ieeexplore.ieee.org/stamp/stamp.jsp?tp=&arnumber=996505 retrieved on Jul. 25, 2023.
Extended European Search Report dated Jul. 6, 2023, for EP Application No. 21754096.2, eight pages.
Extended European Search Report dated Jul. 26, 2021, for EP Application No. 19841636.4, filed Jul. 22, 2019, nine pages.
Final Office Action mailed Apr. 8, 2022, for U.S. Appl. No. 17/175,547, filed Feb. 12, 2021, fourteen pages.
Final Office Action mailed Dec. 10, 2021, for U.S. Appl. No. 17/174,141 filed Feb. 11, 2021, fourteen pages.
Final Office Action mailed Oct. 27, 2020, for U.S. Appl. No. 16/518,891, filed Jul. 22, 2019, fifteen pages.
International Preliminary Report on Patentability and Written Opinion dated Jan. 26, 2021, for PCT Application No. PCT/US2019/042881, filed Jul. 22, 2019, 16 pages.
International Search Report and Written Opinion mailed Apr. 28, 2021, for PCT Application No. PCT/US2021/17508, filed Feb. 10, 2021, 16 pages.
International Search Report and Written Opinion mailed Jun. 15, 2021, for PCT Application No. PCT/US2021/18037, filed Feb. 12, 2021, 17 pages.
International Search Report and Written Opinion mailed May 3, 2021, for PCT Application No. PCT/US2021/18035, filed Feb. 12, 2021, 14 pages.
International Search Report mailed Oct. 2, 2019, for PCT Application No. PCT/US2019/042881, filed Jul. 22, 2019, three pages.
Non-Final Office Action mailed Dec. 15, 2021, for U.S. Appl. No. 17/175,547, filed Feb. 12, 2021, thirteen pages.
Non-Final Office Action mailed Feb. 17, 2022, for U.S. Appl. No. 17/175,467, filed Feb. 12, 2021, 23 pages.
Non-Final Office Action mailed Mar. 16, 2022, for U.S. Appl. No. 17/174,141, filed Feb. 11, 2021, eighteen pages.
Non-Final Office Action mailed May 14, 2020, for U.S. Appl. No. 16/518,891, filed Jul. 22, 2019, eighteen pages.
Non-Final Office Action mailed Sep. 1, 2021, for U.S. Appl. No. 17/174,141, filed Feb. 11, 2021, thirteen pages.
Notice of Allowance mailed Apr. 22, 2021, for U.S. Appl. No. 16/518,891, filed Jul. 22, 2019, nine pages.
Notice of Allowance mailed Aug. 5, 2022, for U.S. Appl. No. 17/175,547, filed Feb. 12, 2021, nine pages.
Notice of Allowance mailed Aug. 9, 2021, for U.S. Appl. No. 16/518,891, filed Jul. 22, 2019, eight pages.
Notice of Allowance mailed Jan. 20, 2022, for U.S. Appl. No. 17/173,125, filed Feb. 10, 2021, twelve pages.
Notice of Allowance mailed Jul. 11, 2022, for U.S. Appl. No. 17/174,141, filed Feb. 11, 2021, nine pages.
Notice of Allowance mailed Nov. 23, 2021, for U.S. Appl. No. 17/173,125, filed Feb. 10, 2021, eleven pages.
Schmalstieg, D. et al. "Bridging Multiple User Interface Dimensions with Augmented Reality", Oct. 2000, In Proceedings IEEE and ACM International Symposium on Augmented Reality (ISAR 2000) pp. 20-29. (Year: 2000).
Shen, Y. et al., "Augmented Reality for Collaborative Product Design and Development", Elsevier, 2009 (Year: 2009).
Youtube, "Augmented Reality—annotating an object" https://www.youtube.com/watch?v=ESOZndNnGh0 (Year: 2019).
Youtube. "Real Object Annotations in Augmented Reality in Product Design", https://www.youtube.com/watch?v=cy8owOreAfl (Year: 2013).
Australian Office Action mailed Dec. 23, 2021, for AU Patent Application No. 2018243460, three pages.
Australian Office Action mailed Oct. 21, 2022, for AU Patent Application No. 2018243460, two pages.
Canadian Office Action dated Mar. 28, 2024, for CA Application No. 3,058,421, four pages.
Chinese Notice of Allowance dated Feb. 9, 2024, for CN Application No. 202180028410.5, with English translation, four pages.
Chinese Notice of Allowance dated Jan. 10, 2024, for CN Application No. 201880023286.1, with English translation, four pages.
Chinese Office Action dated Feb. 22, 2024, for CN Application No. 201980055804.2 with English translation, eleven pages.
Chinese Office Action dated Feb. 8, 2024, for CN Application No. 201980051078.7, with English translation, 19 pages.
Chinese Office Action dated Jul. 24, 2023, for CN Application No. 201880023286.1, with English translation, 5 pages.
Chinese Office Action dated Mar. 7, 2023, for CN Application No. 201880023286.1, with English translation, 17 pages.

(56) References Cited

OTHER PUBLICATIONS

Eikel, B. et al., "Preprocessed Global Visibility for Real-Time Rendering onLow-End Hardware," Nov. 29, 2010, ICIAP: International Conference on Image Analysis and Processing, 17th International Conference, Naples, Italy, Sep. 9-13, 2013. Proceedings; [lecture notes in computer science; LECT.NOTES computer], Springer, Berlin, Heidelberg, pp. 622-633* the whole document*.
European Office Action dated Nov. 2, 2023, for EP Application No. 18778218.0, nine pages.
European Search Report dated Aug. 23, 2021, for EP Application No. 19823464.3, twelve pages.
Final Office Action mailed Aug. 25, 2020, for U.S. Appl. No. 15/940,892, filed Mar. 29, 2018, 41 pages.
Final Office Action mailed Aug. 25, 2020, for U.S. Appl. No. 16/011,413, filed Jun. 18, 2018, 21 pages.
Final Office Action mailed Dec. 4, 2019, for U.S. Appl. No. 15/940,892, filed Mar. 29, 2018, 37 pages.
Final Office Action mailed Dec. 4, 2019, for U.S. Appl. No. 16/011,413, filed Jun. 18, 2018, 15 pages.
Indian Office Action dated Feb. 2, 2022, for IN Application No. 201947041612, with English translation, 4 pages.
International Preliminary Report on Patentability mailed Dec. 30, 2020, for PCT Application No. PCT/US2019/037811 filed on Jun. 18, 2019, eight pages.
International Search Report and Written Opinion mailed Sep. 9, 2019, for PCT Application No. PCT/US19/37811 filed on Jun. 18, 2019, fourteen pages.
International Search Report dated Jul. 30, 2018, for PCT Application No. PCT/US2018/25298 filed on Mar. 29, 2018, four pages.
Israeli Notice of Allowance dated Feb. 23, 2023, for IL Application No. 269545, with English translation, 7 pages.
Israeli Notice of Allowance dated Nov. 29, 2023, for IL Application No. 303169, four pages.
Israeli Office Acton dated Jan. 16, 2022, for IL Application No. 269545, with English translation, 9 pages.
Japanese Notice of Allowance mailed Nov. 30, 2023 for JP Application No. 2020-570684, with English translation, 7 pages.
Japanese Notice of Allowance mailed Sep. 27, 2022, for JP Application No. 2019-553094, with English translation, 6 pages.
Japanese Office Action mailed Aug. 21, 2023, for JP Application No. 2020-570684, with English translation, 5 pages.
Japanese Office Action mailed Dec. 12, 2023, for JP Application No. 2022-176196, with English translation, four pages.
Japanese Office Action mailed Feb. 14, 2022, for JP Application No. 2019-553094, with English translation, 14 pages.
Japanese Office Action mailed Jan. 12, 2024, for JP Application No. 2021-503735, with English translation, six pages.
Korean Notice of Allowance dated Dec. 13, 2023, for KR Application No. 10-2019-7031887, with English translation, 4 pages.
Korean Office Action dated Jun. 2, 2023, for KR Application No. 10-2019-7031887, with English translation, 35 pages.
Kurillo, G. et al., "Teleimmersive 3D Collaborative Environment for Cyberarchaeology," computer vision and pattern recognition workshops (CVPRW), 2010 IEEE computer society conference on, IEEE, Piscataway, NJ, USA, Jun. 13, 2010 (Jun. 13, 2010), pp. 23-28.
Non-Final Office Action mailed Apr. 10, 2024, for U.S. Appl. No. 18/468,629, filed Sep. 15, 2023, thirteen pages.
Non-Final Office Action mailed Dec. 18, 2023, for U.S. Appl. No. 18/314,075, filed May 8, 2023, fifteen pages.
Non-Final Office Action mailed Jun. 20, 2019, for U.S. Appl. No. 15/940,892, filed Mar. 29, 2018, 34 pages.
Non-Final Office Action mailed Jun. 25, 2019, for U.S. Appl. No. 16/011,413, filed Jun. 18, 2018, 14 pages.
Non-Final Office Action mailed Mar. 24, 2020, for U.S. Appl. No. 15/940,892, filed Mar. 29, 2018, 38 pages.
Non-Final Office Action mailed Mar. 24, 2020, for U.S. Appl. No. 16/011,413, filed Jun. 18, 2018, 18 pages.
Non-Final Office Action mailed Oct. 15, 2021, for U.S. Appl. No. 17/236,971, filed Apr. 21, 2021, 13 pages.
Non-Final Office Action mailed Oct. 27, 2022, for U.S. Appl. No. 17/678,332, filed Feb. 23, 2022, 12 pages.
Non-Final Office Action mailed Sep. 16, 2021, for U.S. Appl. No. 17/195,393, filed Mar. 8, 2021, fourteen pages.
Notice of Allowance mailed Dec. 9, 2020, for U.S. Appl. No. 16/011,413, filed Jun. 18, 2018, nine pages.
Notice of Allowance mailed Feb. 11, 2022, for U.S. Appl. No. 17/236,971, filed Apr. 21, 2021, eight pages.
Notice of Allowance mailed Jan. 25, 2021, for U.S. Appl. No. 15/940,892, filed Mar. 29, 2018, eight pages.
Notice of Allowance mailed Jan. 25, 2022, for U.S. Appl. No. 17/195,393, filed Mar. 8, 2021, eight pages.
Notice of Allowance mailed Mar. 22, 2023, for U.S. Appl. No. 17/678,332, filed Feb. 23, 2022, seven pages.
Notice of Allowance mailed May 1, 2024, for U.S. Appl. No. 18/314,075, filed May 8, 2023, eight pages.
Extended European Search Report dated Jun. 7, 2024, for EP Application No. 24165773.3, seven pages.
Japanese Notice of Allowance mailed May 30, 2024, for JP Application No. 2021-503735, with English translation, six pages.
Japanese Notice of Allowance mailed May 30, 2024, for JP Application No. 2022-176196, with English translation, six pages.
Japanese Office Action mailed May 2, 2024, for JP Application No. 2022-548903, with English translation, five pages.

* cited by examiner

3D OBJECT ANNOTATION

CROSS-REFERENCE TO RELATED APPLICATIONS

This application is a Continuation of U.S. Non-Provisional application Ser. No. 17/174,141, filed Feb. 11, 2021, which claims benefit of U.S. Provisional Application No. 62/977,073, filed Feb. 14, 2020, the contents of which is incorporated herein by reference in its entirety.

FIELD

This disclosure relates in general to systems and methods for presenting and annotating virtual content, and in particular to systems and methods for presenting and annotating virtual content in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

XR systems may be uniquely positioned to enable greater collaboration between people. The ability to present virtual content in a persistent and three-dimensional manner can allow people to more naturally interact with virtual content. For example, arranging virtual objects in three-dimensional space may enable much more natural location recall than what two-dimensional screens can offer. Where a user of a two-dimensional screen may have to hunt through one of forty open tabs to re-open a desired application, a user of an XR system may be able to pinpoint a desired virtual object displayed on a desk (like picking up a real folder placed on a desk). Furthermore, XR systems may enable users to see virtual avatars of other users to simulate the live presence of other people. This may enable more natural collaboration than what a telephone call or even videoconference can offer. It can therefore be desirable to develop systems and methods for enabling deep user collaboration on XR systems.

XR systems can offer a uniquely heightened sense of immersion and realism by combining virtual visual and audio cues with real sights and sounds. Accordingly, it is desirable in some XR systems to present a virtual environment that enhances, improves, or alters a corresponding real environment. This disclosure relates to XR systems that enable consistent placement of virtual objects across multiple XR systems.

BRIEF SUMMARY

Examples of the disclosure describe systems and methods for presenting and annotating virtual content. According to an example method, a virtual object is presented to a first user at a first position via a transmissive display of a wearable device. A first input is received from the first user. In response to receiving the first input, a virtual annotation is presented at a first displacement from the first position via the transmissive display. A first data is transmitted to a second user, the first data associated with the virtual annotation and the first displacement. A second input is received from the second user. In response to receiving the second input, the virtual annotation is presented to the first user at a second displacement from the first position via the transmissive display. Second data is transmitted to a remote server, the second data associated with the virtual object, the virtual annotation, the second displacement, and the first position.

DETAILED DESCRIPTION

Figure 1A:
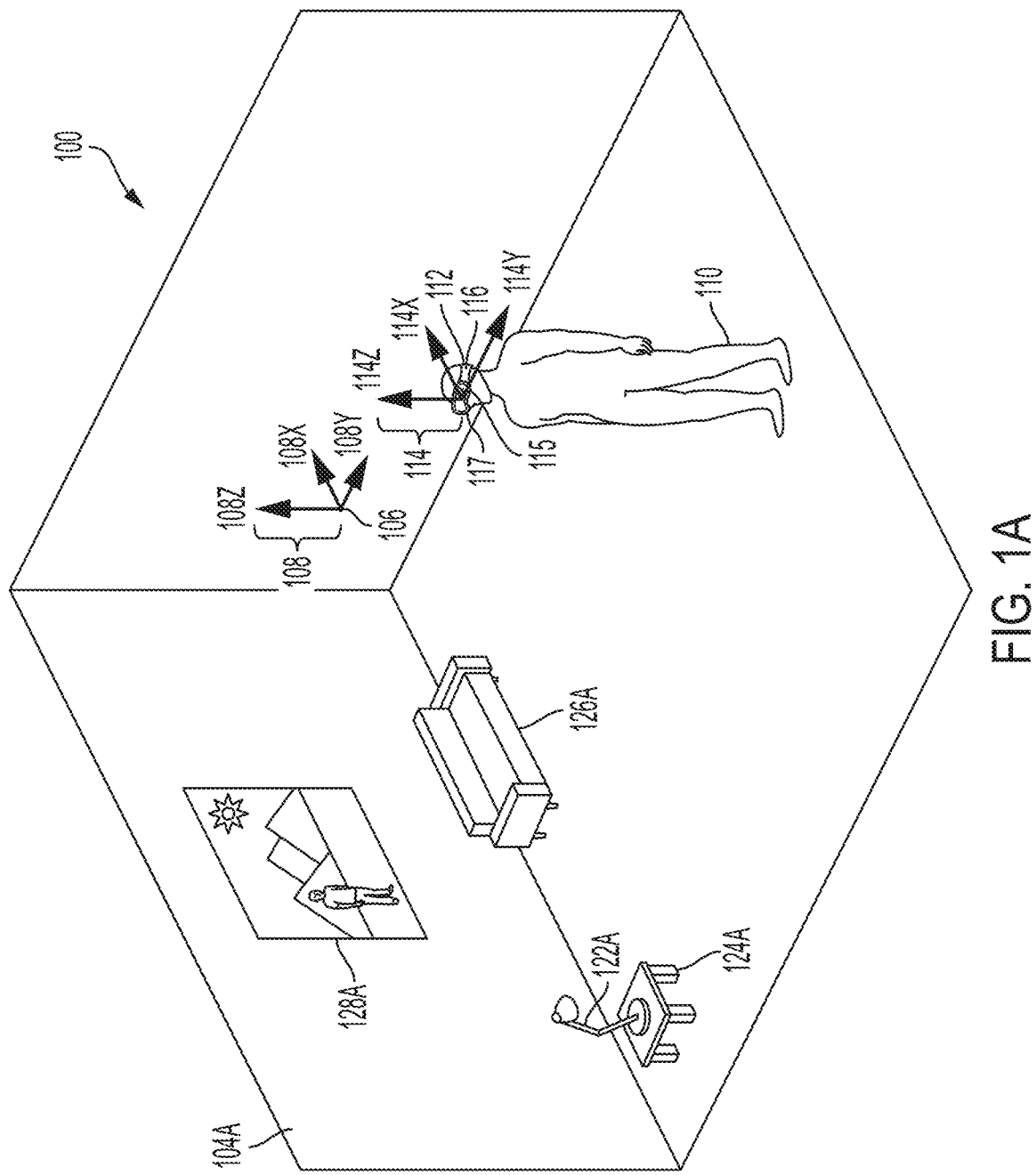
FIGS. 1A-1C illustrate an example mixed reality environment, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, an MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In an MRE, a virtual object (e.g., in a virtual environment associated with the MRE) can correspond to a real object (e.g., in a real environment associated with the MRE). For instance, if the real environment of an MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MRE, not all real objects in a real environment may be associated with a corresponding virtual object. Likewise, in some examples of an MRE, not all virtual objects in a virtual environment may be associated with a corresponding real object. That is, some virtual objects may solely in a virtual environment of an MRE, without any real-world counterpart.

In some examples, virtual objects may have characteristics that differ, sometimes drastically, from those of corresponding real objects. For instance, while a real environment in an MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
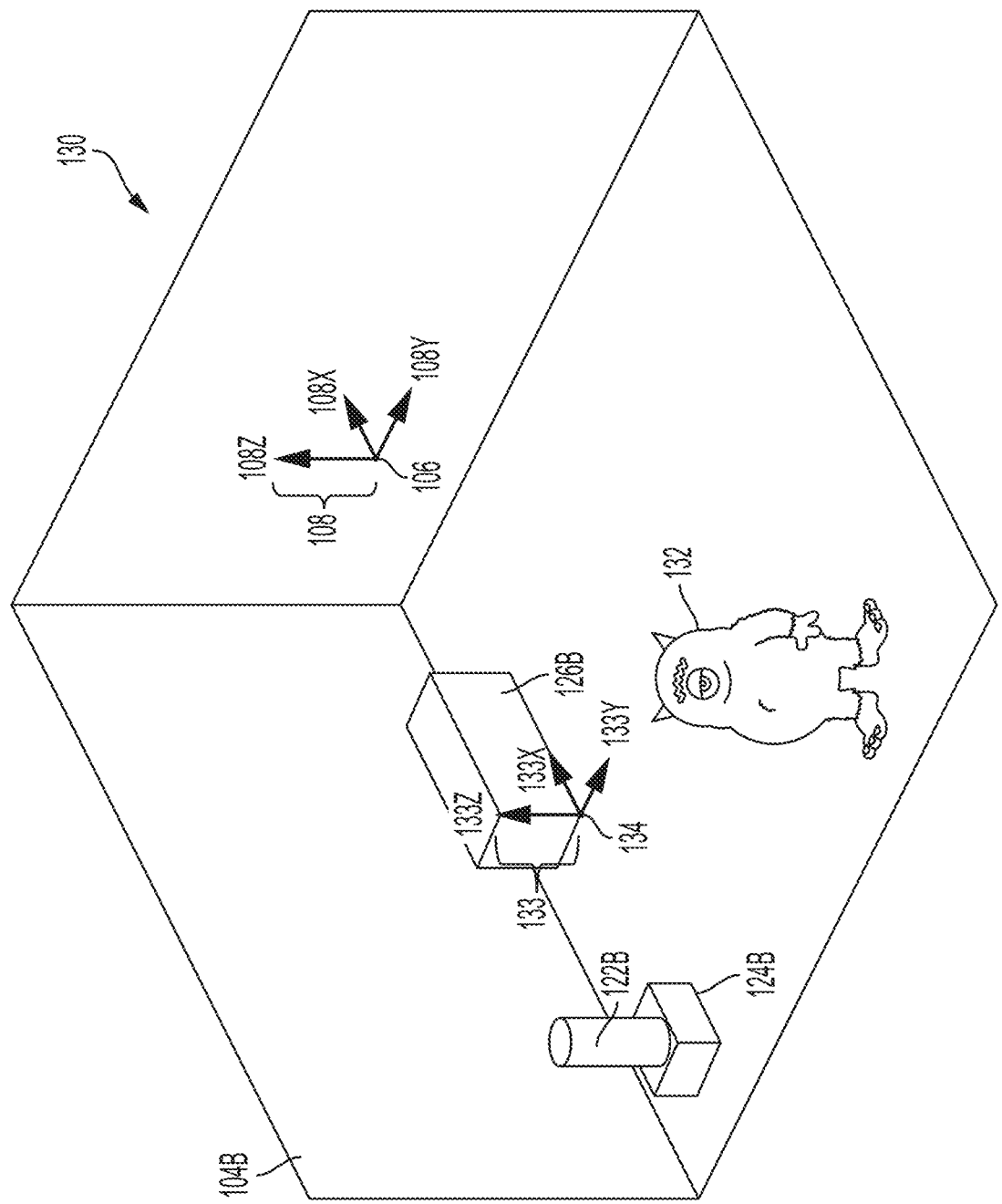

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. An MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by an MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, an MR system may use simultaneous localization and mapping to generate persistent coordinate data (e.g., the MR system may assign a persistent coordinate system to a point in space). In some embodiments, an MR system may map an environment by generating persistent coordinate data at regular intervals (e.g., an MR system may assign persistent coordinate systems in a grid where persistent coordinate systems may be at least within five feet of another persistent coordinate system).

In some embodiments, persistent coordinate data may be generated by an MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, an MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
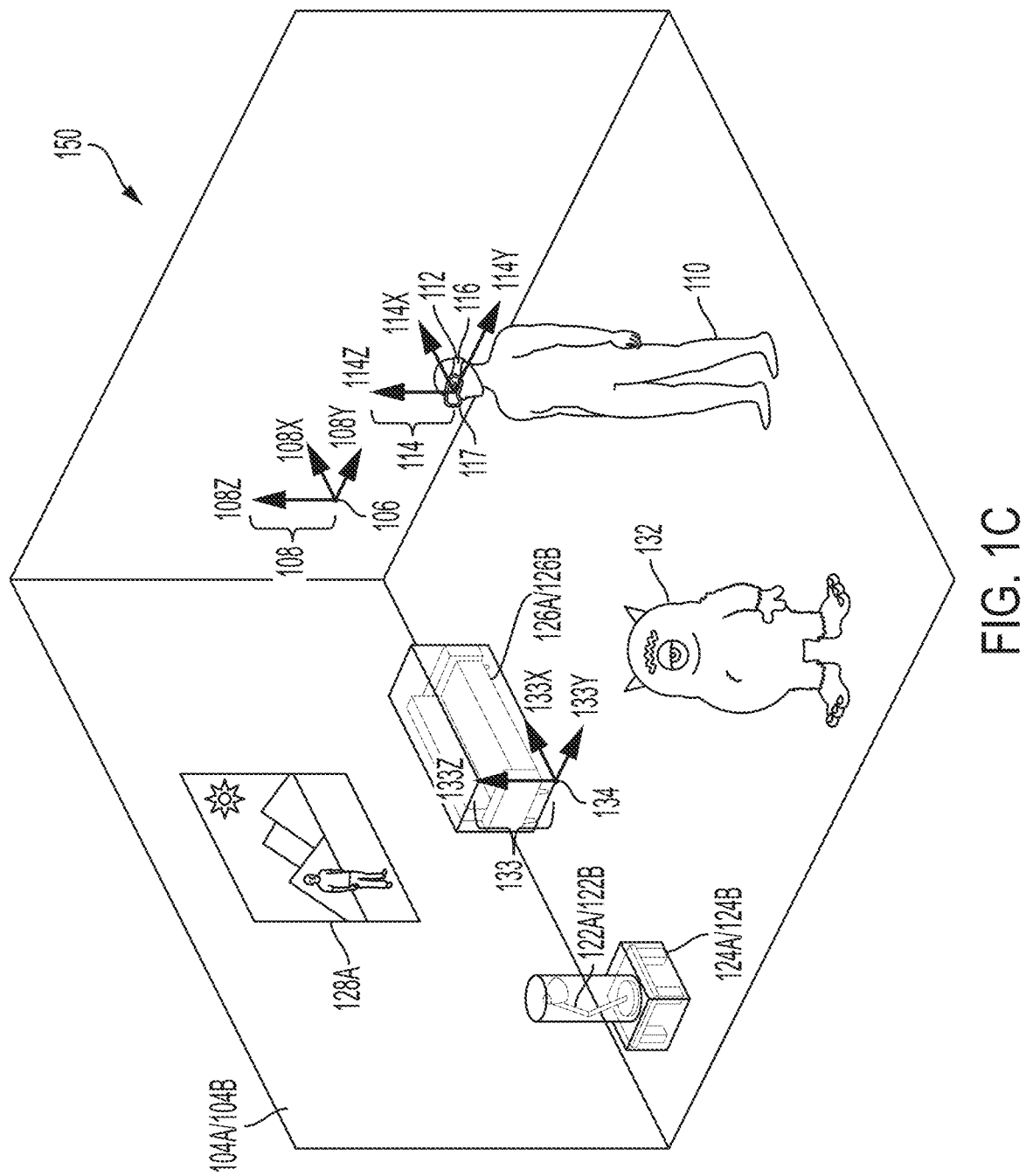

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
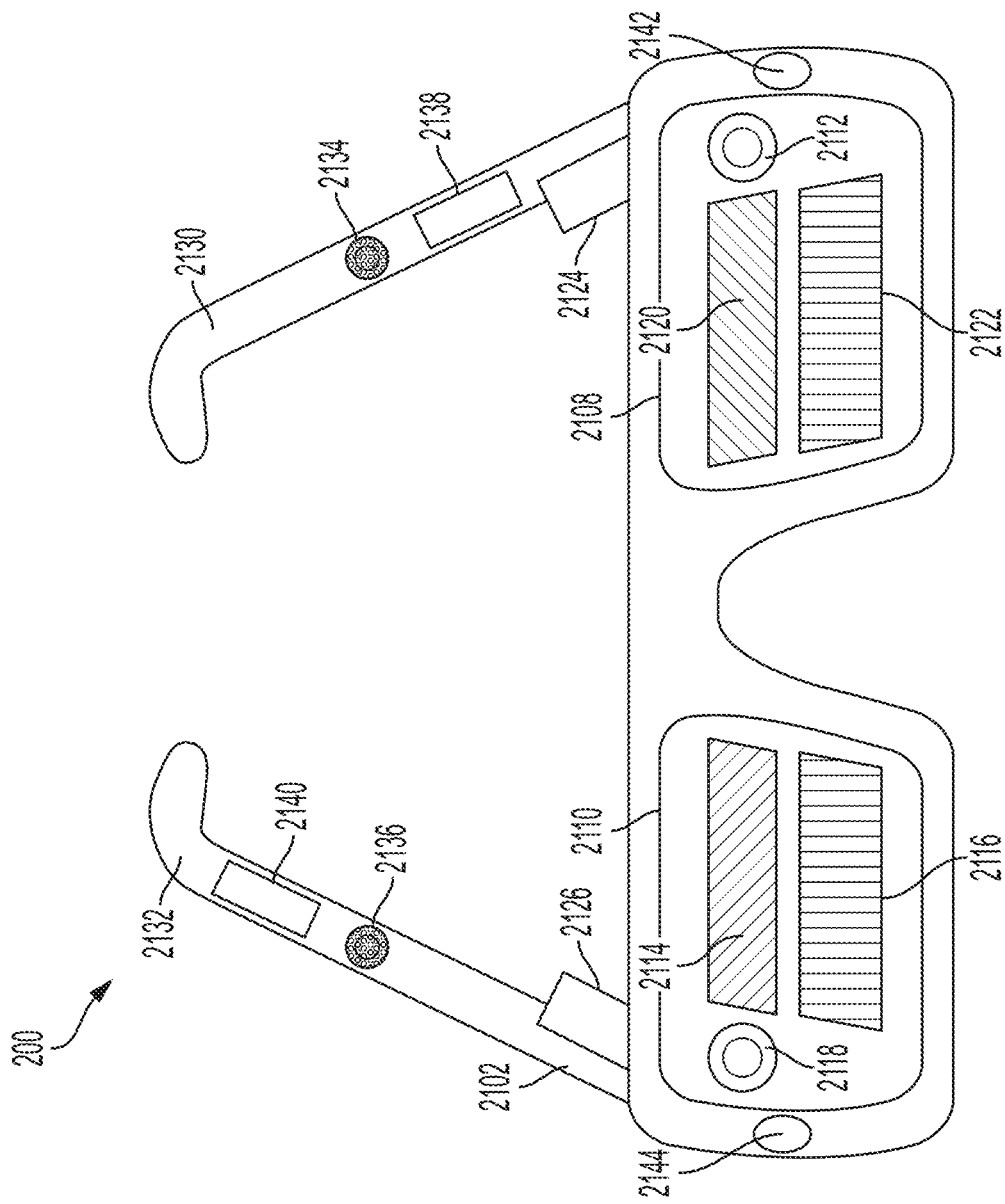
FIGS. 2A-2D illustrate components of an example mixed reality system that can be used to generate and interact with a mixed reality environment, according to some embodiments.
Figure 2B:
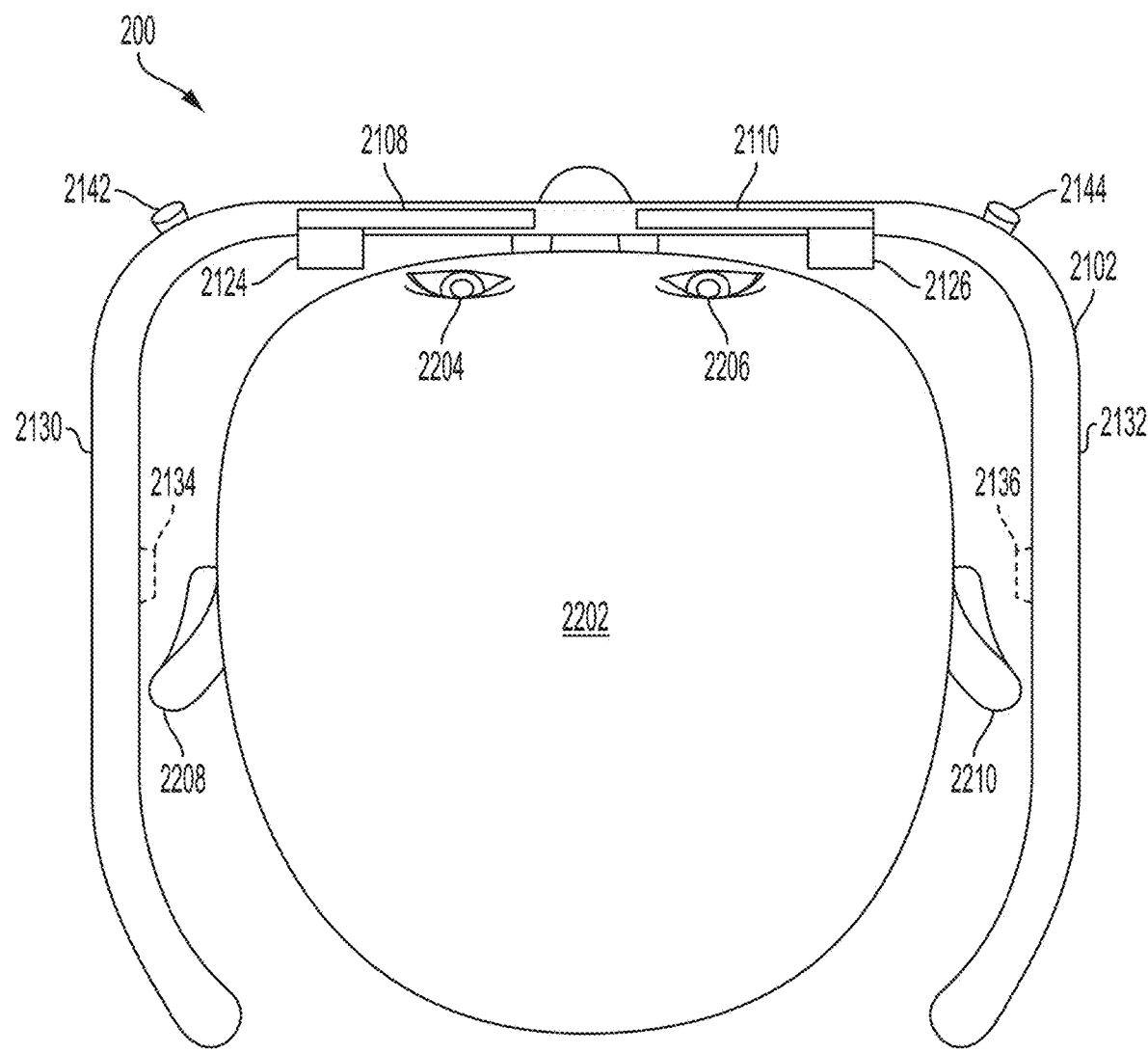
Figure 2C:
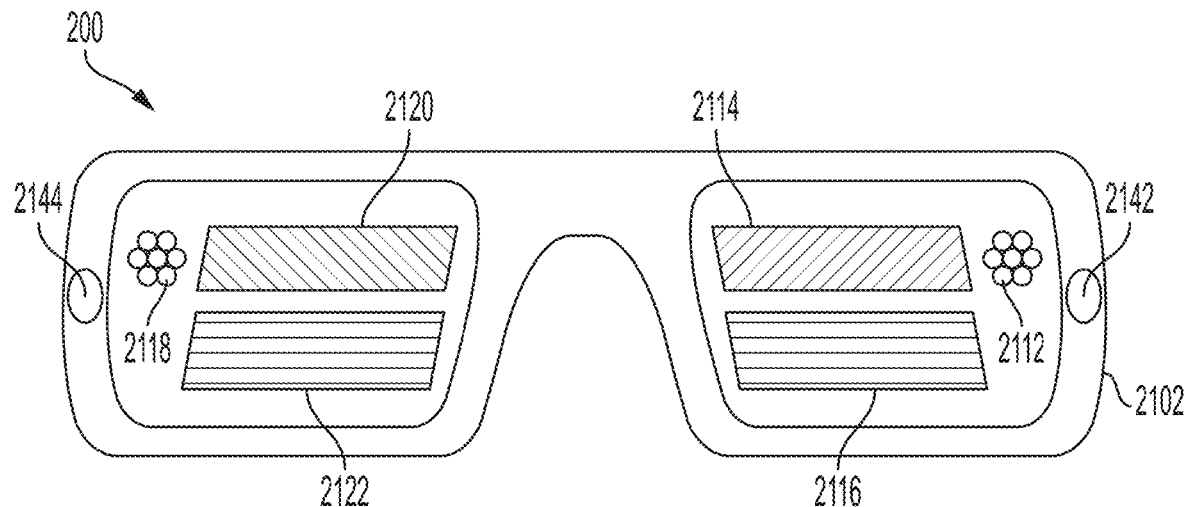
Figure 2D:
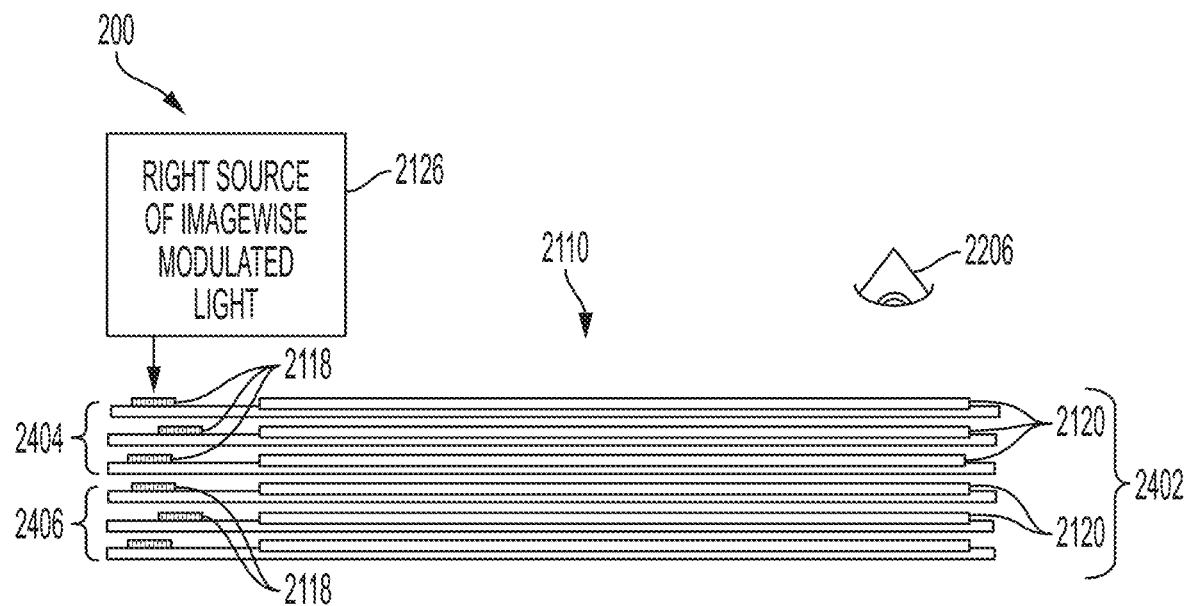

FIGS. 2A-2D illustrate components of an example mixed reality system 200 (which may correspond to mixed reality system 112) that may be used to present an MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
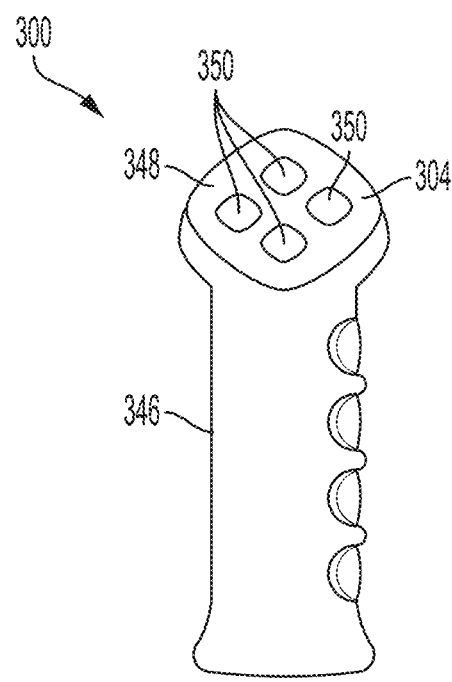
FIG. 3A illustrates an example mixed reality handheld controller that can be used to provide input to a mixed reality environment, according to some embodiments.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
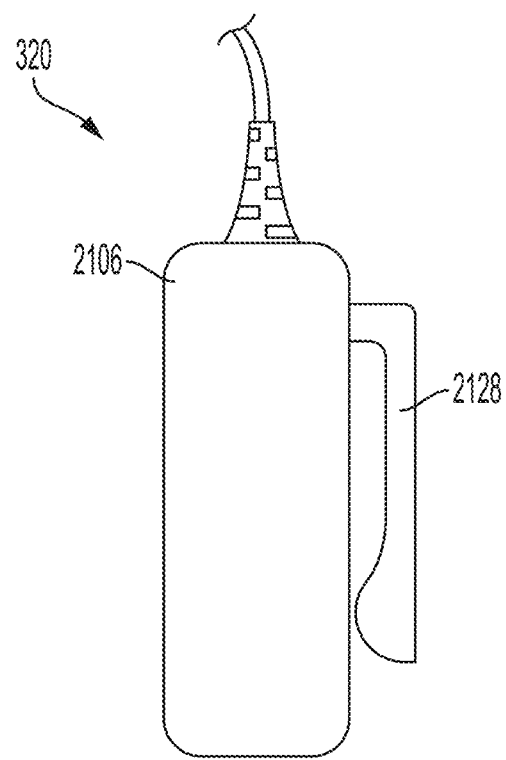
FIG. 3B illustrates an example auxiliary unit that can be used with an example mixed reality system, according to some embodiments.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
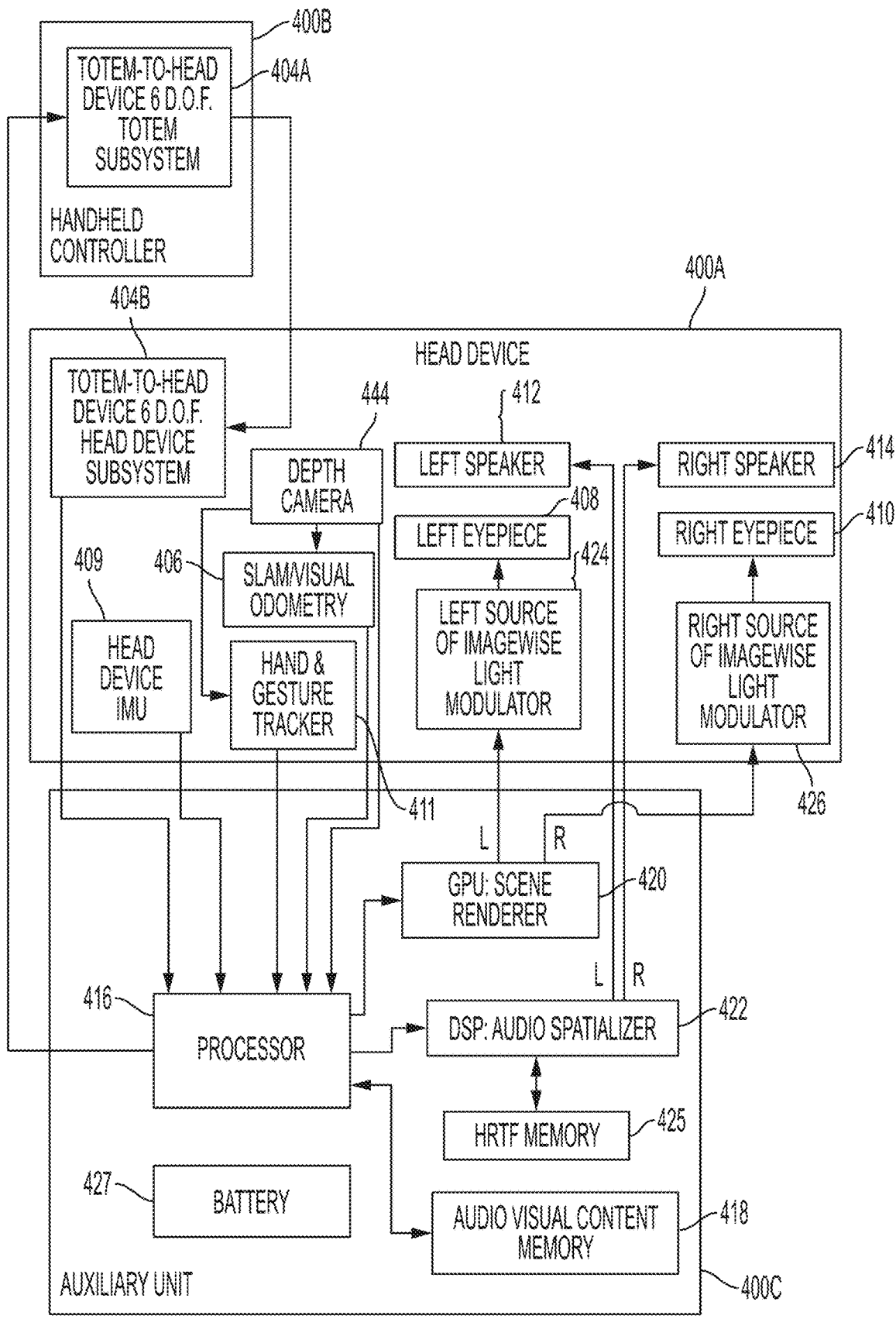
FIG. 4 illustrates an example functional block diagram for an example mixed reality system, according to some embodiments.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Session Manager

MR systems may be uniquely positioned to enable interactive virtual collaboration between users. Because MR systems may present virtual content three-dimensionally and in a user's physical environment, MR collaboration systems and methods may enable remote collaboration that can be at least as effective as local collaboration. In some embodiments, MR collaboration can allow users to see and/or manipulate virtual content in three-dimensional space. For example, a first user may launch an MR collaboration session and may see two virtual 3D models, a text document, and a messaging interface. A second user may join the session locally (e.g., the second user may walk into the same room as the first user), and the second user may see the same two virtual 3D models, text document, and messaging interface in the same location as the first user. In some embodiments, a third user may join the session remotely (e.g., the third user may not be in the same room as the first and the second users), and the third user may see the two virtual 3D models, text document, and messaging interface in the third user's environment. In some embodiments, the virtual content may share spatial relationships with each other (e.g., the virtual content may be arranged the same way) for all session users. In some embodiments, MR collaboration may allow users in the same physical space to leverage the shared physical context to enjoy more meaningful shared experiences involving virtual content.

In some embodiments, displaying and/or synchronizing virtual content across multiple MR systems may pose challenges. For example, it can be beneficial to develop systems and methods for ensuring each MR system displays shared virtual content in a manner that is consistent with other MR systems in a session. It can also be beneficial to develop systems and methods that may enable cross-application collaboration (e.g., virtual content that may be generated using applications created by different developers). In some embodiments, it can be beneficial to develop systems and methods that may allow users that are local to each other (e.g., users that are in the same room) to collaborate with each other as well as with users that are remote (e.g., in a different room). In some embodiments, it can be beneficial to develop systems and methods that may enable collaboration sessions to persist over time such that session users may continue collaborating at a later time. In some embodiments, it can be beneficial to develop systems and methods that may enable content persistence such that a session user to continue working on virtual content even without collaborating live with other users.

In some embodiments, a session may be broadly defined as a group of users (with identifiers) that can collaborate and share a series of experiences over time and space. In some embodiments, a session can include a communication and collaboration experience that provides network connectivity, common spatial references and a centralized user interface for chatting and sharing prisms with other MR users. Session participants can be remote or local in the same physical location. In some embodiments, a session manager can include a centralized backend service that manages some or all activity within a session. In some embodiments, session manager can include one or more user-facing, front-end controls and/or expressions representing session manager and/or configured to receive user input (e.g., a menu and/or a session handle). In some embodiments, session manager can include a background service and/or daemon that orchestrates and manages various session events through various session states. Session manager may also drive the user experience by allowing users to be discovered and get connected with other users. In some embodiments, session manager may also manage various UI components such as a menu and/or session UI related states.

In some embodiments, collaboration can be facilitated by configuring virtual content in a collaboration session to behave similarly to real objects in collaboration sessions. For example, in a "real" collaboration session, users may sit around a table with documents and/or objects. Users may refer to "this" document and/or "that" document by pointing at a particular document. In some embodiments, users in a real collaboration session may refer to objects using relational terms (e.g., that object to the right). This behavior may occur naturally to users as a result of years of conditioning and working physically with other people. It can therefore be desirable to develop systems and methods for MR collaboration to enable natural interactions between users and the content on which they are collaborating on. In some embodiments, MR collaboration sessions can enable users to refer to collocated virtual content (e.g., virtual content that may appear in the same position in a real environment to multiple users) as if it were real content present in the user's physical environment. In some embodiments, MR collaboration sessions can persist. For example, all users may exit a session, and a user may launch the same session several weeks later. In some embodiments, the user may see all virtual content in the state at which it existed (e.g., in the same relative positions and/or with the same edits) when the users previously exited the session.

In some embodiments, a session can include a platform for presenting, synchronizing, managing, and/or storing virtual content used in a mixed reality collaboration session. For example, session users may have a recurring weekly meeting in which virtual content (e.g., word documents, 3D models, presentation slides, conversation history, etc.) are discussed and/or worked on. In some embodiments, users may leverage the platform of sessions to consolidate virtual content (which may be created by different developers) into a single virtual space that may persist over time. For example, loading a single session instance may present to a user a 3D model (generated using a first application created by a first developer), a text document describing goals and/or changes to the 3D model (generated using a second application created by a second developer), and a conversation history between session users related to this session. This virtual content may persist across time and across session users, such that the same user or a different session user may load the session and see the same session contents as any other session user. In some embodiments, a session may enable user presence flexibility (e.g., local users may share virtual content placement in their local space, but remote users may also see virtual content with the same spatial relationships in their remote space). In some embodiments, a session may enable capability flexibility. For example, capabilities (e.g., corresponding to third-party applications) can be interacted with/enabled/disabled without leaving a centralized session platform. In some embodiments, applications (e.g., third-party applications) may leverage the session platform to forgo building proprietary sharing platforms that may not be compatible with other apps. In some embodiments, a session may enable temporal flexibility. For example, users may access sessions at different times, and a live call with other users may not be necessary. In some embodiments, changes made by users can be synchronized such that the change may be reflected for other session users (whether they are currently in the session or enter the session at a later time).

In some embodiments, a session may include virtual content shared with one or more users over time. A session may have one or more owners, and in some embodiments, a user who created the session may be considered a session owner. A session may have one or more participants who may have access to the session. In some embodiments, a session owner may control what participants may join the session. In some embodiments, a session may have a session identifier. In some embodiments, each user (e.g., owner or participant) may have a user identifier. In some embodiments, a session may include one or more user avatars, which may represent a remote user's positioning relative to other objects in a session. In some embodiments, a session may include location data (e.g., location data corresponding to each user, location data corresponding to locations the session has been opened in, etc.). Location data may include persistent coordinate data. In some embodiments, location data may include one or more transforms (e.g., one or more transformation matrices), which may relate a position to persistent coordinate data.

In some embodiments, a session can include one or more capabilities. A session capability may include one or more features that users can select and/or enable in a session. For example, virtual object sharing may be considered a session capability. In some embodiments, determining whether users are local to other users may be considered a session capability. In some embodiments, projecting a user avatar may be considered a session capability. In some embodiments, casting a user's screen to other users may be considered a session capability. In some embodiments, a capability can have one or more capability instances (e.g., a capability can have multiple instances running at the same time). For example, two virtual objects may be shared with users in a session, and each virtual object may be considered a separate capability instance.

In some embodiments, a session may be persistent. For example, a session may continue to exist even after all users have exited a session. In some embodiments, a session may continue to store session information such as session capabilities used (e.g., sharing a virtual object, what position the virtual object was in, etc.), user locations, user identifications, etc. Persistent sessions may facilitate long-term collaboration between users. For example, users may continue where they left off without having to rearrange their virtual workspace to their preference. In some embodiments, session persistence may enable a different user to enter the session at a later time and see virtual content arranged as it was when a previous user exited the session.

Figure 5A:
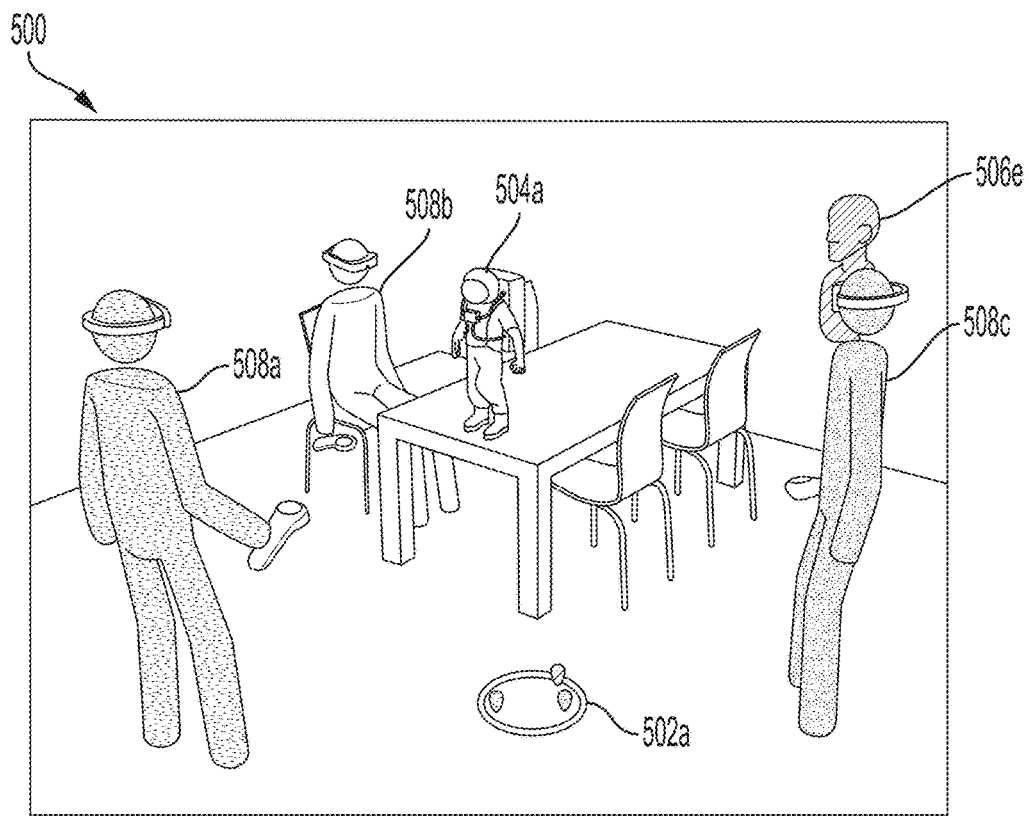
FIGS. 5A-5C illustrate an example of a mixed reality collaboration session, according to some embodiments.
Figure 5B:
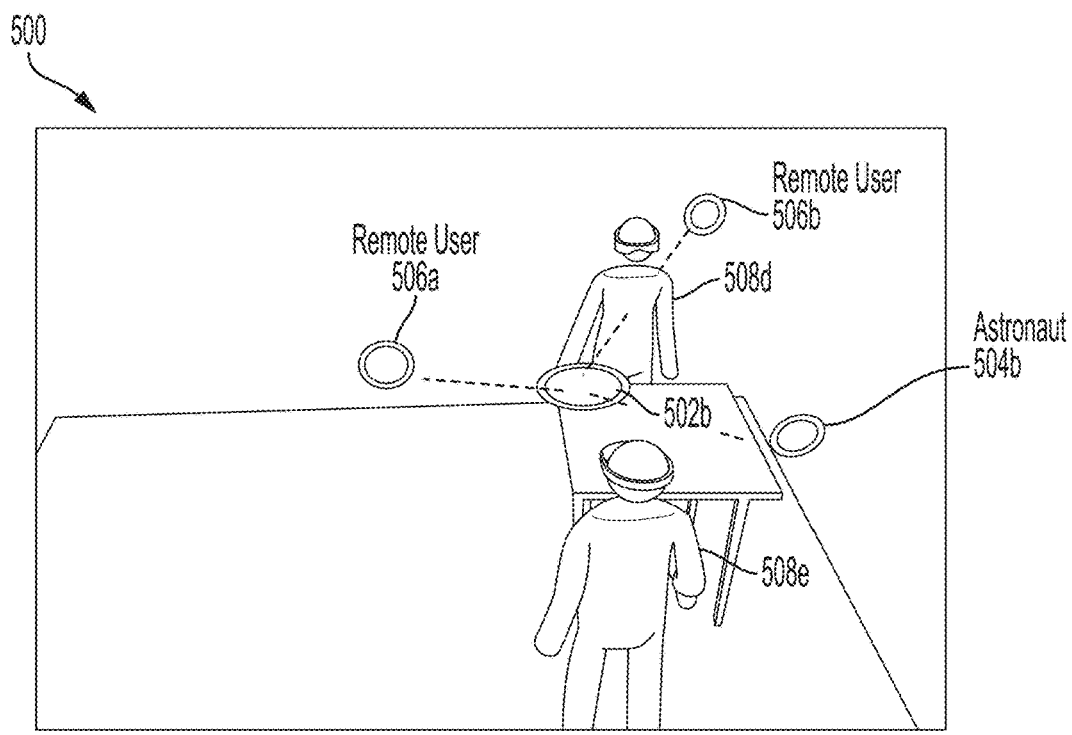
Figure 5C:
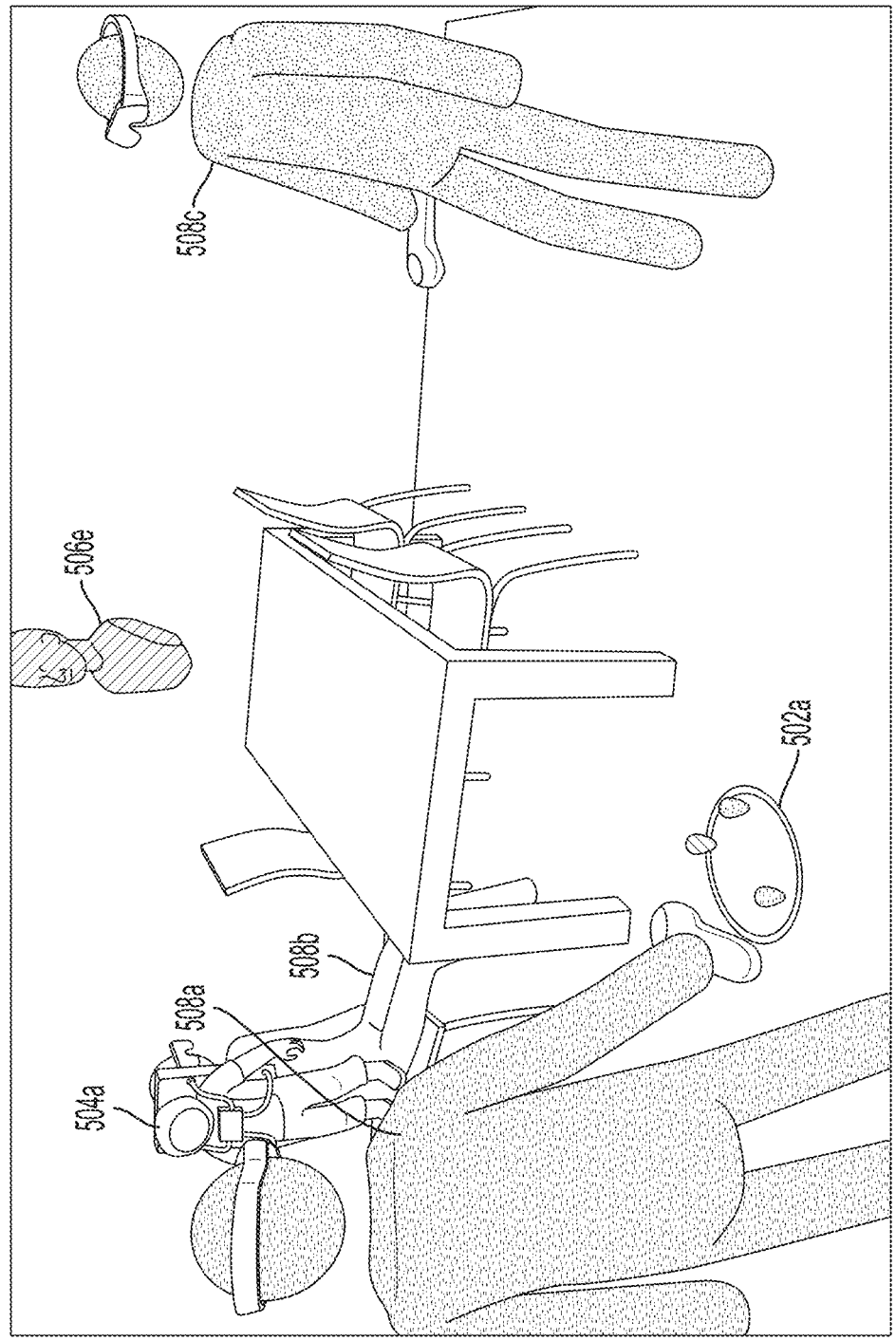

FIGS. 5A-5C illustrate an exemplary MR collaboration session, according to some embodiments. FIG. 5A illustrates an exemplary mixed reality collaboration session where users 508a, 508b, and 508c may be at a first location (e.g., a first room) together. FIG. 5B illustrates an exemplary mixed reality collaboration session where users 508d and 508e may be at a second location (e.g., a second room) together. FIG. 5C illustrates an exemplary mixed reality collaboration session where a session handle has been moved.

In some embodiments, users 508a, 508b, 508c, 508d, and 508e may all be part of the same mixed reality collaboration session 500. In some embodiments, a collaboration session can include a session handle 502a (which may be a virtual object). Session handle 502a may serve as a local anchor for a session. For example, all session users in the same location (e.g., users 508a, 508b, and 508c may be considered in the same location if they share common persistent coordinate data) may be presented virtual content positioned relative to session handle 502a, which may give the virtual content the appearance of being located in a particular location and orientation in the real world, similar to a real/physical object. In some embodiments, session handle 502a may be positioned relative to persistent coordinate data (e.g., using a transform). In some embodiments, users 508a, 508b, and 508c may be using canonical persistent coordinate data, which may enable consistent placement of session handle 502a in each user's MR system. In some embodiments, users 508a, 508b, and 508c may all see session handle 502a at the same location (e.g., the users may all see session handle 502a on the floor at the same location).

In some embodiments, whether users can be considered local to each other may be determined using persistent coordinate data. For example, an MR system for user 508a may receive (e.g., from one or more remote servers) canonical persistent coordinate data based on an identified environment for user 508a. An MR system for user 508a may use location data (e.g., GPS, WiFi, and/or cellular data) and/or image recognition data (e.g., recognizing a known environment by comparing captured images with images of known environments) to identify an environment for user 508a. In some embodiments, an MR system for user 508a may transmit its received persistent coordinate data to other MR systems in a session (e.g., an MR system for user 508b). In some embodiments, other MR systems in a session may receive canonical persistent coordinate data and compare the transmitted data received from other MR systems with canonical persistent coordinate already in use (and/or canonical persistent coordinate data received from one or more remote servers). If it is determined (e.g., using unique identifiers) that one or more instances of canonical persistent coordinate data is shared between MR systems in a session, it can be determined that the MR systems are local to each other. In some embodiments, if MR systems do not share instances of canonical persistent coordinate data, it may be determined that the MR systems are remote from each other. In some embodiments, a session handle (e.g., session handle 502*a*) may be displayed in relation to one or more shared instances of persistent canonical persistent coordinate data, which may enable session handle 502*a* to be presented in the same location to users 508*a*, 508*b*, and 508*c*.

In some embodiments, session 500 can include a shared virtual object 504*a*. Shared virtual object 504*a* may be considered a session capability instance. In some embodiments, users 508*a*, 508*b*, and 508*c* may all see virtual object 504*a* in the same location (e.g., the users may all see virtual object 504*a* at the end of a real table). In some embodiments, shared virtual object 504*a* may be positioned relative to session handle 502*a* (e.g., using a transform). In some embodiments, shared virtual object 504*a* may be positioned relative to persistent coordinate data (e.g., canonical persistent coordinate data). In some embodiments, a user (e.g., user 508*c*) may manipulate shared virtual object 504*a*. For example, user 508*c* may move object 504*a* from the edge of the table to the center of the table. In some embodiments, users 508*a* and 508*b* may also see object 504*a* move from the edge of the table to the center of the table. In some embodiments, if a user (e.g., user 508*b*) points to a portion of object 504*a* (e.g., the helmet), other users (e.g., 508*a* and 508*c*) may also see user 508*b* as pointing at the same portion of object 504*a*.

In some embodiments, session handle 502*a* may also be moved. For example, in FIG. 5C, user 508*a* may move session handle 502*a* to the left. In some embodiments, any virtual content displayed as part of a session may also move, thereby maintaining the same relative positioning to session handle 502*a*. For example, as session handle 502*a* is moved to the left, object 504*a* may also be moved to the left by the same amount. In some embodiments, moving a session handle at one location (e.g., session handle 502*a*) may not move a session handle at a different location (e.g., session handle 502*b*). It can be beneficial to allow each group of local users to manage their own session handle placement. For example, because virtual content may be positioned relative to a session handle, each local group may determine an optimal location for their virtual content for their respective local physical environments.

Session 500 can involve users that may not share the same location. For example, in FIG. 5B, users 508*d* and 508*e* may also be part of session 500. In some embodiments, users 508*d* and 508*e* may be considered remote to users 508*a*, 508*b*, and 508*c* (e.g., because there may not be common persistent coordinate data between users 508*d*/508*e* and 508*a*/508*b*/508*c*). In some embodiments, users 508*d* and 508*e* may see a second session handle 502*b*. In some embodiments, each user (or group of users) that does not have common persistent coordinate data with other users (or groups of users) may see their own session handle. Shared virtual content displayed to users 508*d* and 508*e* may be displayed relative to session handle 502*b*. For example, shared virtual object 504*b* may correspond to object 504*a*. In some embodiments, object 504*b* may be positioned in the same spot relative to session handle 502*b* as object 504*a* is positioned relative to session handle 502*a*. In some embodiments, if object 504*a* is moved relative to session handle 502*a*, object 504*b* may also move relative to session handle 502*b* (and vice versa). In some embodiments, session handle 502*b* may not move if session handle 502*a* is moved. This may enable local users to manage how session contents are presented to the local group of users.

In some embodiments, session 500 can include a user avatar 506*e*. In some embodiments, user avatar 506*e* can represent a user in session 500 that may be remote to other users in the session. For example, users 508*a*, 508*b*, and 508*c* may be considered local to each other (e.g., because they may share persistent coordinate data), and user 508*e* may be considered remote from users 508*a*, 508*b*, and 508*c* (e.g., because user 508*e* may not share persistent coordinate data with the other users). In some embodiments, user 508*e* (in FIG. 5B) may also be part of session 500, and user avatar 506*e* may correspond to user 508*e*.

In some embodiments, user avatar 506*e* may enable user 508*e* to collaborate with users 508*a*, 508*b*, and 508*c*. In some embodiments, avatar 506*e* may mirror one or more movement of user 508*e*. For example, as user 508*e* approaches session handle 502*b*, user avatar 506*e* may approach session handle 502*a*, thereby maintaining the same relative positioning between user 508*e* and session handle 502*b*. In some embodiments, user 508*e* may point to object 504*b*, and avatar 506*e* may correspondingly point to object 504*a* at the same location. Similarly, avatar 506*b* may represent user 508*b*, and avatar 506*a* may represent user 508*a*. As user 508*a* approaches object 504*a*, avatar 506*a* may also approach object 504*b* accordingly. In some embodiments, a remote user may not broadcast an avatar to other users. For example, user 508*d* may be remote to users 508*a*, 508*b*, and 508*c*, but user 508*d* may not project a corresponding avatar for session handle 502*a*.

In some embodiments, session persistence may allow users to dynamically localize to different session locations. For example, users 508*a*, 508*b*, and 508*c* may be in a first room, and users 508*d* and 508*e* may be in a second room, which may be down the hall from the first room. In some embodiments, user 508*a* may leave the first room, walk down the hall and enter the second room, and virtual content may be displayed to user 508*a* relative to session handle 502*b*. In some embodiments, each MR system used by a user may periodically poll the user's location (e.g., using GPS data and/or image recognition). In some embodiments, an MR system may trigger a new location query (e.g., by using geofencing).

Figure 6:
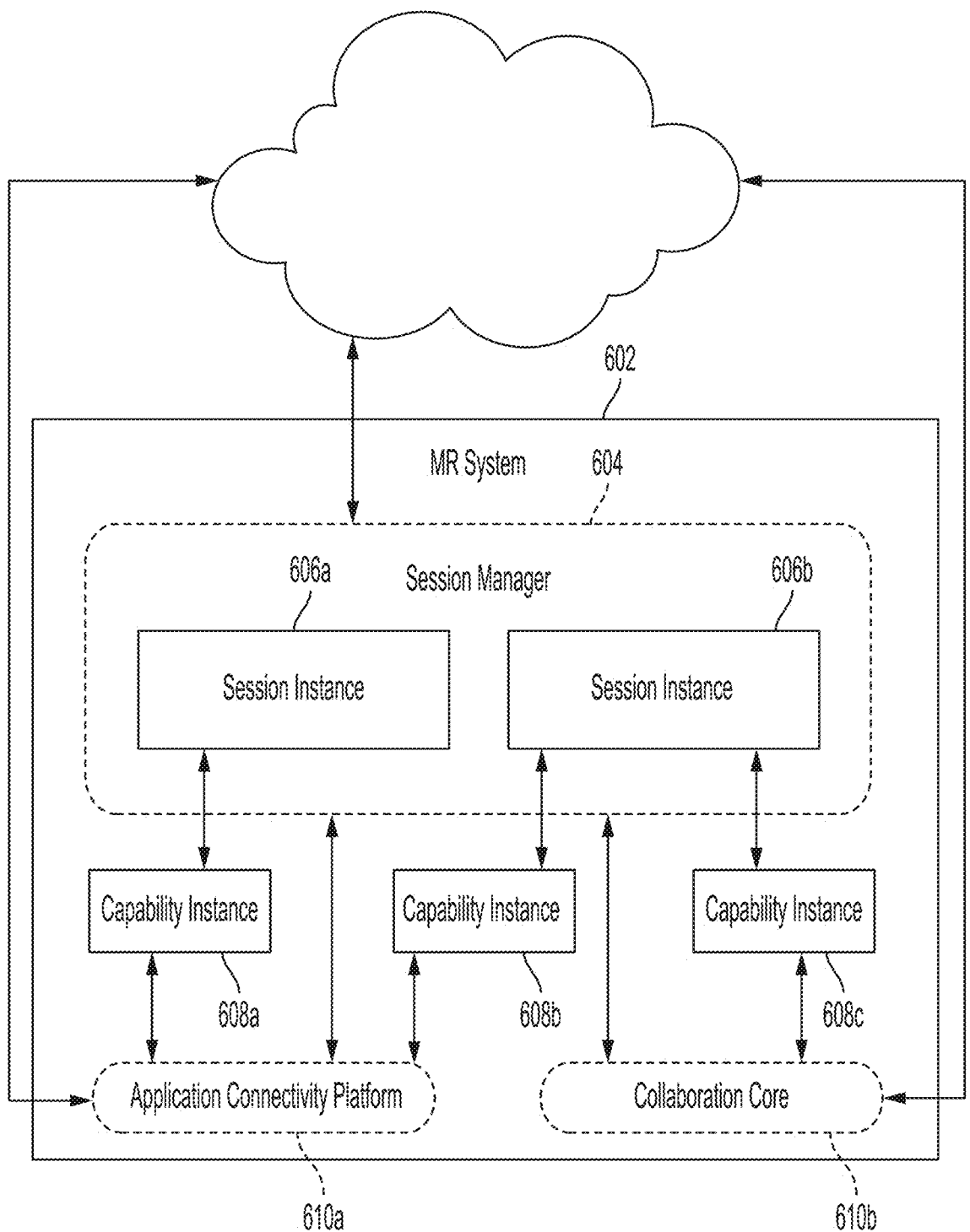
FIG. 6 illustrates an example of a session manager architecture, according to some embodiments.

FIG. 6 illustrates an exemplary session manager architecture, according to some embodiments. In some embodiments, session manager 604 may run on MR system 602, which may include one or more computer systems and can correspond to MR systems 112, 200. In some embodiments, session manager 604 can include a process, sub-process, thread, and/or service. In some embodiments, session manager 604 can include one or more data structures configured to store information. In some embodiments, session manager 604 can include a service (e.g., a background operating system service). In some embodiments, a process, sub-process, thread, and/or service of session manager 604 can be configured to continually run (e.g., in the background) while an operating system of a host system is running. In some embodiments, session manager 604 can include an instantiation of a parent background service, which may serve as a host process to one or more background processes and/or sub-processes. In some embodiments, session manager 604 can include a sub-process of a parent process. In some embodiments, session manager 604 can include a thread of a parent process.

Session manager 604 may include one or more session instances 606*a* and/or 606*b*. In some embodiments, a session instance can correspond to an MR collaboration session (e.g., session 500). In some embodiments, a session instance may manage information used in an MR collaboration session. In some embodiments, a session instance may include one or more data structures configured to store information. In some embodiments, a session instance may include one or more processes, sub-processes, threads, and/ or services. In some embodiments, one or more session instances may be stored at one or more remote servers. In some embodiments, session instances may be encrypted before it is stored (locally at an MR device or at one or more remote servers).

In some embodiments, a session instance may be configured to communicate with one or more capability instances. For example, session instance 606b may be configured to communicate with capability instances 608b and 608c. A capability instance may correspond to one or more session capabilities. For example, capability instance 608b may correspond to shared object 504a. In some embodiments, a capability instance may include one or more data structures configured to store information. In some embodiments, a capability instance may include one or more processes, sub-processes, threads, and/or services.

In some embodiments, a capability instance can be configured to communicate with one or more connectivity services, such as application connectivity platform 610a and/or collaboration core 610b. In some embodiments, application connectivity platform 610a and/or collaboration core 610b can include a process, sub-process, thread, and/or service. In some embodiments, application connectivity platform 610a and/or collaboration core 610b can include one or more data structures configured to store information. In some embodiments, application connectivity platform 610a and/or collaboration core 610b can include a service (e.g., a background operating system service). In some embodiments, a process, sub-process, thread, and/or service of application connectivity platform 610a and/or collaboration core 610b can be configured to continually run (e.g., in the background) while an operating system of a host system is running. In some embodiments, application connectivity platform 610a and/or collaboration core 610b can include an instantiation of a parent background service, which may serve as a host process to one or more background processes and/or sub-processes. In some embodiments, application connectivity platform 610a and/or collaboration core 610b can include a sub-process of a parent process. In some embodiments, application connectivity platform 610a and/or collaboration core 610b can include a thread of a parent process.

In some embodiments, application connectivity platform 610a can provide a low-latency communication pathway between MR systems in a colocation session to enable real-time virtual object colocation. In some embodiments, application connectivity platform 610a can include one or more implementations of Web Real-Time Communication ("WebRTC"). For example, in some embodiments, data may be transmitted via one or more Twilio tracks for low-latency communication. In some embodiments, capability instances may utilize application connectivity platform 610a to send and/or receive low-latency data (e.g., relational transform data as a shared virtual object moves) from MR systems in a session. In some embodiments, application connectivity platform 610a can be configured to communicate with other application connectivity platforms running on other MR systems.

In some embodiments, collaboration core 610b can provide data synchronization services for simultaneous edits. In some embodiments, collaboration core 610b can be configured to receive edit data from one or more capability instances. In some embodiments, collaboration core 610b can be configured to communicate with external synchronization services (e.g., Firebase) to synchronize simultaneous edits to virtual content in a session.

In some embodiments, application connectivity platform 610a and/or collaboration core 610b may communicate with session manager 604. In some embodiments, session manager 604 may provide privileged information directly to application connectivity platform 610a and/or collaboration core 610b (e.g., user identification data). It can be beneficial to shield privileged information from capability instances because a capability instance may be developed by an unknown developer, which may pose a security risk to the privileged data.

Although application connectivity platform 610a and collaboration core 610b are depicted as separate services, it is also contemplated that functions provided by each could be provided as a single service or more than two services.

In some embodiments, session manager 604 may communicate with one or more remote servers and/or with one or more MR systems to synchronize session instances. For example, a second MR system may initiate a session and invite MR system 602 to participate in the session. In some embodiments, session manager 604 may create a new session instance corresponding to the newly joined session. In some embodiments, the new session instance may be a copy of a session instance on the second MR system. In some embodiments, a session instance may be received from one or more remote servers. In some embodiments, session instance data may be transmitted to one or more remote servers (e.g., if a capability instance has been updated, it can be desirable to transmit the update to other session users). In some embodiments, session instance data can be transmitted to one or more remote servers at an end of a session (e.g., when the last user leaves a session), so that session data may be preserved and re-accessed at a later time. In some embodiments, session manager and/or a session instance may communicate with one or more services (e.g., one or more services provided by application connectivity platform 610a) to synchronize session instance data with other session instances (that may be stored at another MR system or a remote server). In some embodiments, session manager and/or a session instance may communicate with one or more services to establish a real-time and/or low-latency communication link with one or more remote end points (e.g., other MR systems in a session).

Figure 7:
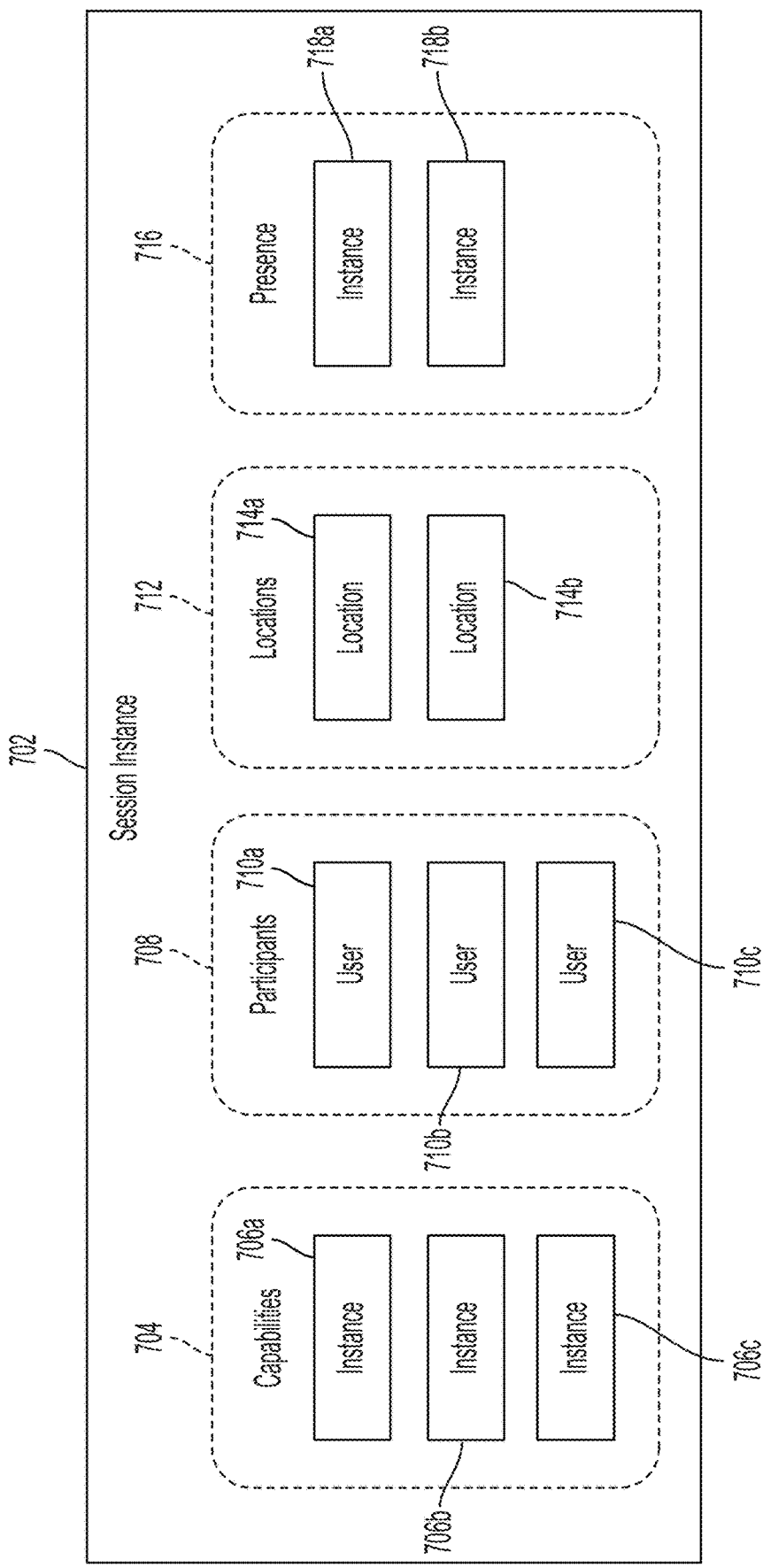
FIG. 7 illustrates an example of a session instance, according to some embodiments.

FIG. 7 illustrates an exemplary session instance architecture, according to some embodiments. In some embodiments, session instance 702 may correspond to session instance 604a and/or 604b. In some embodiments, session instance 702 can include one or more data structures, which can be configured to store one or more additional data structures (e.g., capabilities module 704, participants module 708, locations module 712, and/or presence module 716). Capabilities module 704 may manage data and/or data structures corresponding to one or more capability instances in a session. For example, instance 706a may correspond to a virtual object. In some embodiments, instance 706a may include transform data, which may relate the virtual object's position to persistent coordinate data and/or one or more session handle locations. In some embodiments, instance 706a may include one or more references to a collaboration core service. In some embodiments, references to a collaboration core service may enable instance 706a to be properly notified and/or updated if a change is made to instance 706a by a user. In some embodiments, instance 706a may include application connectivity platform data (e.g., where data should be sent to, what pipes should be used, etc.). In some embodiments, capabilities module 704 may be configured to communicate with one or more capability instances (e.g., capability instance 608a).

In some embodiments, session instance 702 may include participants module 708. Participants module 708 may manage data and/or data structures corresponding to one or more users in a session. For example, user 710a may include an identifier for an MR system used by a user. In some embodiments, user 710a may include avatar data (e.g., appearance, size, color, etc.). In some embodiments, user 710a may include location data. In some embodiments, location data can include GPS data, WiFi data, cellular data, persistent coordinate data, etc.

In some embodiments, session instance 702 may include locations module 712. Locations module 712 may manage data and/or data structures corresponding to one or more locations in a session. For example, location 714a may include persistent coordinate data, transformation data, data corresponding to a floor plane, etc. In some embodiments, location 714a may correspond to a user location. In some embodiments, location 714a may correspond to a session handle location.

In some embodiments, session instance 702 may include presence module 716. Presence module 716 may manage data and/or data structures corresponding to local and/or remote status of one or more users. For example, instance 718a may indicate that a first user is remote from a second user, and a third user is local to the second user. In some embodiments, instance 718a may include data used for communication between users (e.g., using application connectivity platform 610a).

3D Object Annotation

MR collaboration can be especially useful for 3D virtual content creation. Leveraging virtual object persistence, MR systems may enable users to see virtual content as if the virtual content was real. For example, a virtual object may be displayed as resting on a real table. In some embodiments, a user could walk around the table and observe the virtual object from different angles as if the virtual object was really sitting on the table. This ability to naturally view and/or interact with virtual content may be superior to other methods. For example, viewing a 3D model on a 2D screen can require a number of workarounds. Users may have to use a computer mouse to drag the 3D model around to display different viewing angles. However, due to the nature of displaying 3D content on a 2D screen, such an experience can be frustrating as the 3D content may change views in unintended ways. In some embodiments, MR systems may also enable multiple users to collaborate on 3D content. For example, two users working on the same 3D content may view the 3D content projected in three-dimensional space using MR systems. In some embodiments, the 3D content may be synchronized and/or positioned the same way for both users of MR systems. Users may then collaborate by referring to aspects of 3D content, moving around to view different angles, etc. In some embodiments, annotations to virtual content can be made available to collaborating users in real time. For example, a first user may add virtual markup and/or comments to virtual content, and a second user may see the virtual markup and/or comments as the first user creates them. It can therefore be beneficial to develop systems and methods to enable real-time collaboration on 3D objects.

Figure 8:
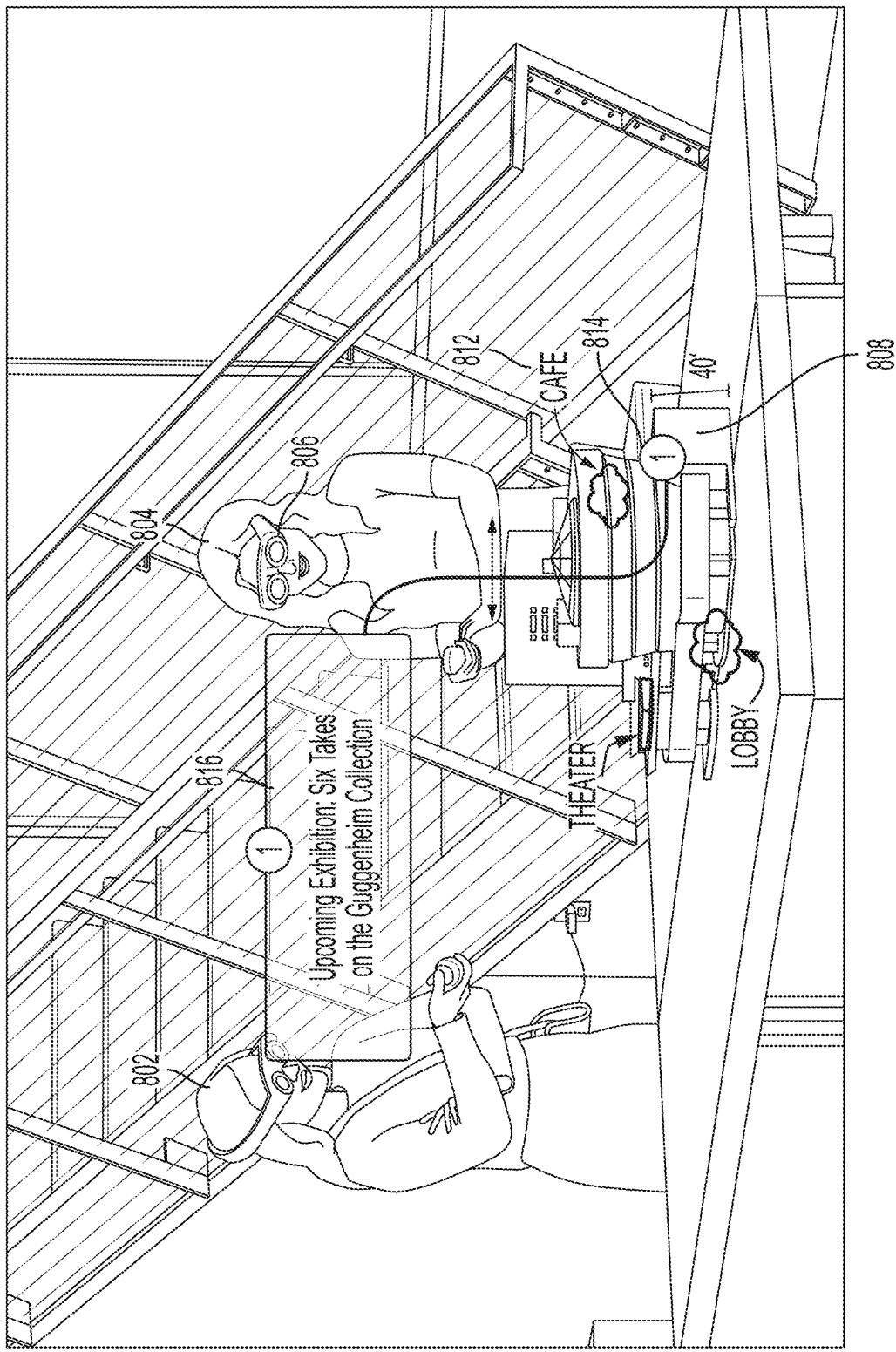
FIG. 8 illustrates an example of a mixed reality collaboration session, according to some embodiments.

FIG. 8 illustrates an exemplary mixed reality collaboration session, according to some embodiments. In some embodiments, users 802 and 804 may use one or more MR systems (e.g., MR system 806, which can correspond to MR systems 112, 200) to collaborate on 3D virtual content. In some embodiments, users 802 and 804 may utilize a session to display and/or collaborate on virtual content. For example, virtual model 808 may be presented to users 802 and 804. In some embodiments, virtual model 808 can be presented to users 802 and 804 in the same position (e.g., location and/or orientation). In some embodiments, virtual model 808 can be presented to users 802 and 804 using the same session handle. In some embodiments, virtual model 808 may be managed by a capability instance. In some embodiments, properties of virtual model 808 can be stored in and/or managed by a capability instance. In some embodiments, a capability instance can be stored in and/or managed by a session instance.

In some embodiments, user 802 may annotate virtual model 808 (e.g., by creating virtual markup and/or adding virtual comments). For example, user 802 may create virtual markup 812, which may indicate that a café could be placed at a location in virtual model 808. In some embodiments, user 804 may see virtual markup 812. In some embodiments, user 804 may see virtual markup 812 as user 802 is creating virtual markup 812. In some embodiments, user 804 may see virtual markup 812 in the same location as user 802 sees virtual markup 812. In some embodiments, user 802 can create one or more virtual comments. In some embodiments, a virtual comment can include location indicator 814 and/or comment bubble 816. In some embodiments, comment bubble 816 can include a visual indicator corresponding to location indicator 814 (e.g., comment bubble 816 and location indicator 814 can share a number). In some embodiments, location indicator 814 may be presented to user 804 in the same position (e.g., relative to the real world, and/or relative to other virtual content) as it is presented to user 802. In some embodiments, comment bubble 816 can be presented in different positions for different users. For example, comment bubble 816 may be presented to user 802 as facing user 802, and comment bubble 816 may be presented to user 804 as facing user 804. In some embodiments, comment bubble 816 may be configured to continually face a user as a user looks in different locations. In some embodiments, comment bubble 816 can be presented in the same position for multiple users (e.g., all local users) of a session.

In some embodiments, data corresponding to virtual annotations may be transmitted from a capability instance (e.g., capability instance 608c) to a session instance (e.g., session instance 606b). In some embodiments, data corresponding to virtual annotations may be transmitted from a capability instance to collaboration core 610b. In some embodiments, collaboration core 610b may transmit data corresponding to virtual annotations to one or more remote servers (e.g., one or more remote servers configured to handle data synchronization and/or synchronization conflicts). In some embodiments, one or more remote servers may transmit data corresponding to virtual annotations to other session users. In some embodiments, data corresponding to virtual annotations can be stored in a session instance. In some embodiments, a session instance can be closed and re-opened, and one or more capability instances (e.g., virtual model 808 and/or virtual markup 812) can be loaded and/or displayed to users.

In some embodiments, user 802 may be remote from user 804. For example, user 802 may be in a first room, and user 804 may be in a second room different than the first room. In some embodiments, users 802 and 804 may collaborate on virtual model 808 using a session instance. In some embodiments, user 802 may see virtual model 808 in the first room, and user 804 may see virtual model 808 in the second room. In some embodiments, virtual model 808 may be presented relative to a first session handle for user 802, and virtual model 808 may be presented relative to a second session handle for user 804. In some embodiments, virtual annotations made by one user (e.g., user 802) may be visible to all session users (e.g., user 804).

Figure 9:
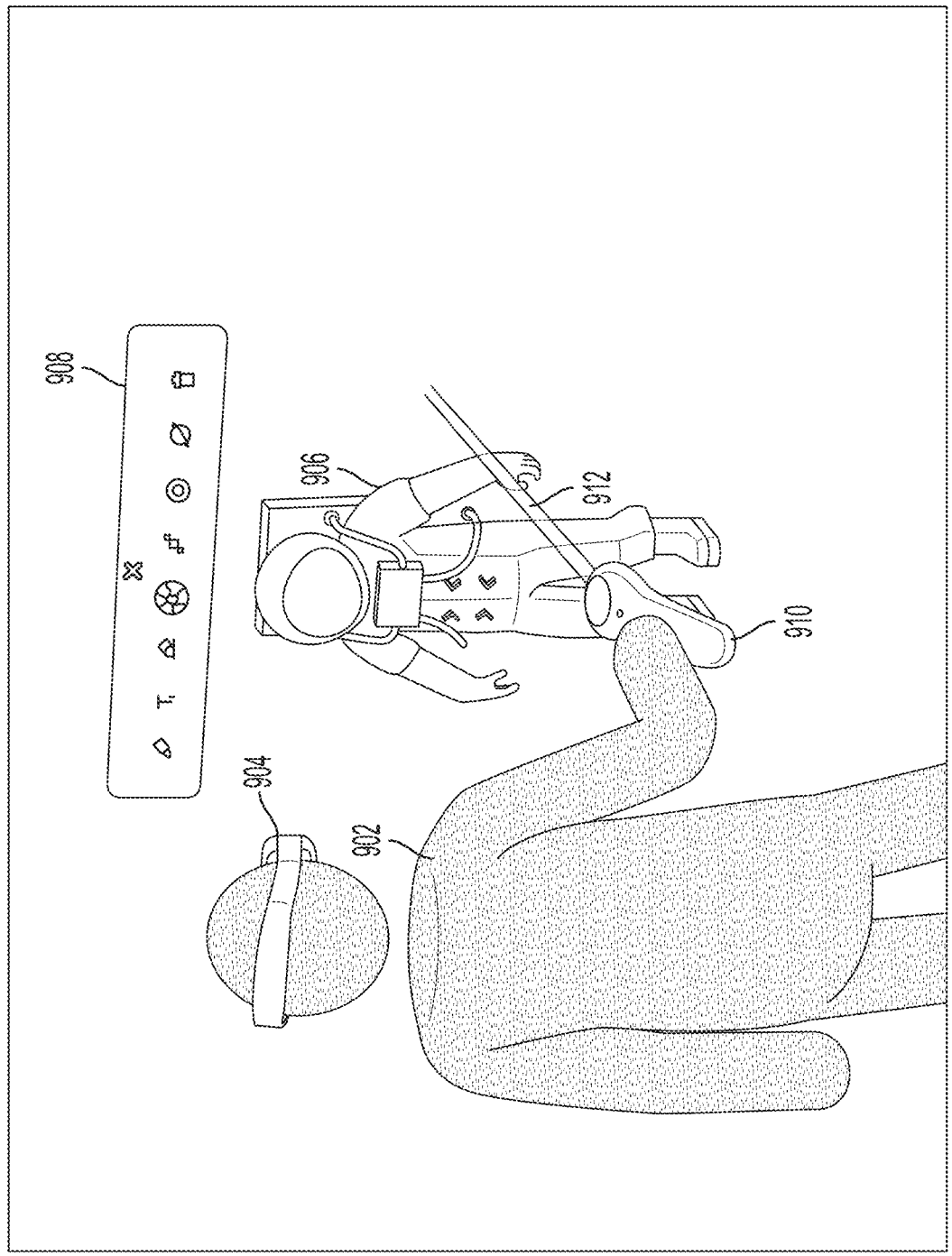
FIG. 9 illustrates an example of an annotation menu, according to some embodiments.

FIG. 9 illustrates an exemplary annotation menu, according to some embodiments. In some embodiments, user 902 may use MR system 904 to view virtual object 906. In some embodiments, MR system 904 may display annotation menu 908, which may allow user 902 to annotate virtual object 906. In some embodiments, MR system 904 may dynamically display annotation menu 908 as facing user 902 regardless of which direction user 902 is facing. For example, as user 902 moves around object 906, annotation menu 908 may rotate so that the full menu can be visible to user 902. It can be desirable to dynamically orient annotation menu 908 because it may be difficult for user 902 to select options on annotation menu 908 if annotation menu 908 is displayed at an angle to user 902 (e.g., because the effective visible area of buttons on annotation menu 908 may be too small for user 902 to identify and/or select). In some embodiments, a desired orientation for menu 908 can be determined by determining a position (e.g., location and/or orientation) of a head of user 902. In some embodiments, menu 908 can be oriented such that a normal vector of menu 908 is directed at user 902. In some embodiments, MR system 904 may display annotation menu 908 in proximity to a corresponding virtual object (e.g., virtual object 906).

In some embodiments, MR system 904 may display annotation menu 908 such that annotation menu 908 may not be occluded by virtual object 906. For example, if annotation menu 908 is displayed in front of object 906, and user 902 moves to the opposite side of object 906, annotation menu 908 may be wholly or partially occluded by object 906. It can be desirable to dynamically reposition annotation menu 908 such that a corresponding virtual object (e.g., a virtual object being annotated using menu 908) may not occlude annotation menu 908 (e.g., because user 902 may not be able to interact with menu 908 if it is occluded by a corresponding virtual object). In some embodiments, occlusion may be determined by determining whether virtual object 906 (and/or a prism associated with virtual object 906) intersects a direct path between user 902 and annotation menu 908.

Annotation menu 908 can have several features for annotating virtual objects. For example, annotation menu 908 can include a virtual draw button. In some embodiments, a virtual draw button can toggle drawing mode, which may enable a user to create virtual markup on and/or around a virtual object. In some embodiments, virtual markup created in draw mode may be visible to other session users. In some embodiments, annotation menu 908 can include a virtual delete button. In some embodiments, a virtual delete button may delete a selected virtual object and/or virtual markup. In some embodiments, annotation menu 908 can include a virtual comment button. In some embodiments, virtual comment button may enable a user to place a location indicator for a virtual comment and/or add a virtual comment. In some embodiments, annotation menu 908 can include a virtual color picker button. In some embodiments, selecting a virtual color picker button may enable a user to select a color for virtual markup. In some embodiments, annotation menu 908 can include a virtual size toggle button. In some embodiments, selecting a virtual size toggle button can toggle whether a virtual object is displayed life-size. For example, a 3D model may include parameters such as dimensions. In some embodiments, an MR system may display a 3D model at a modified size to make the 3D model easily viewable. For example, a 3D model of a building may be initially presented to a user as much smaller than its true dimensions so that a user may easily see the entirety of the 3D model. In some embodiments, annotation menu 908 can include a virtual annotation visibility button. In some embodiments, selecting the virtual annotation visibility button may toggle the visibility (e.g., the display may display or not display) of annotations (e.g., virtual markup and/or virtual comments) corresponding to a virtual object. In some embodiments, annotation menu 908 can include a virtual clear button. In some embodiments, selecting the virtual clear button can remove all virtual annotations corresponding to a virtual object.

In some embodiments, user 902 may move virtual object 906. For example, user 902 may use handheld controller 910 (which can correspond to handheld controller 300) and a virtual selection beam 912 to select virtual object 906 and drag virtual object 906 to a new position. In some embodiments, annotation menu 908 may move with virtual object 906 and maintain a relative position to virtual object 906.

Figure 10:
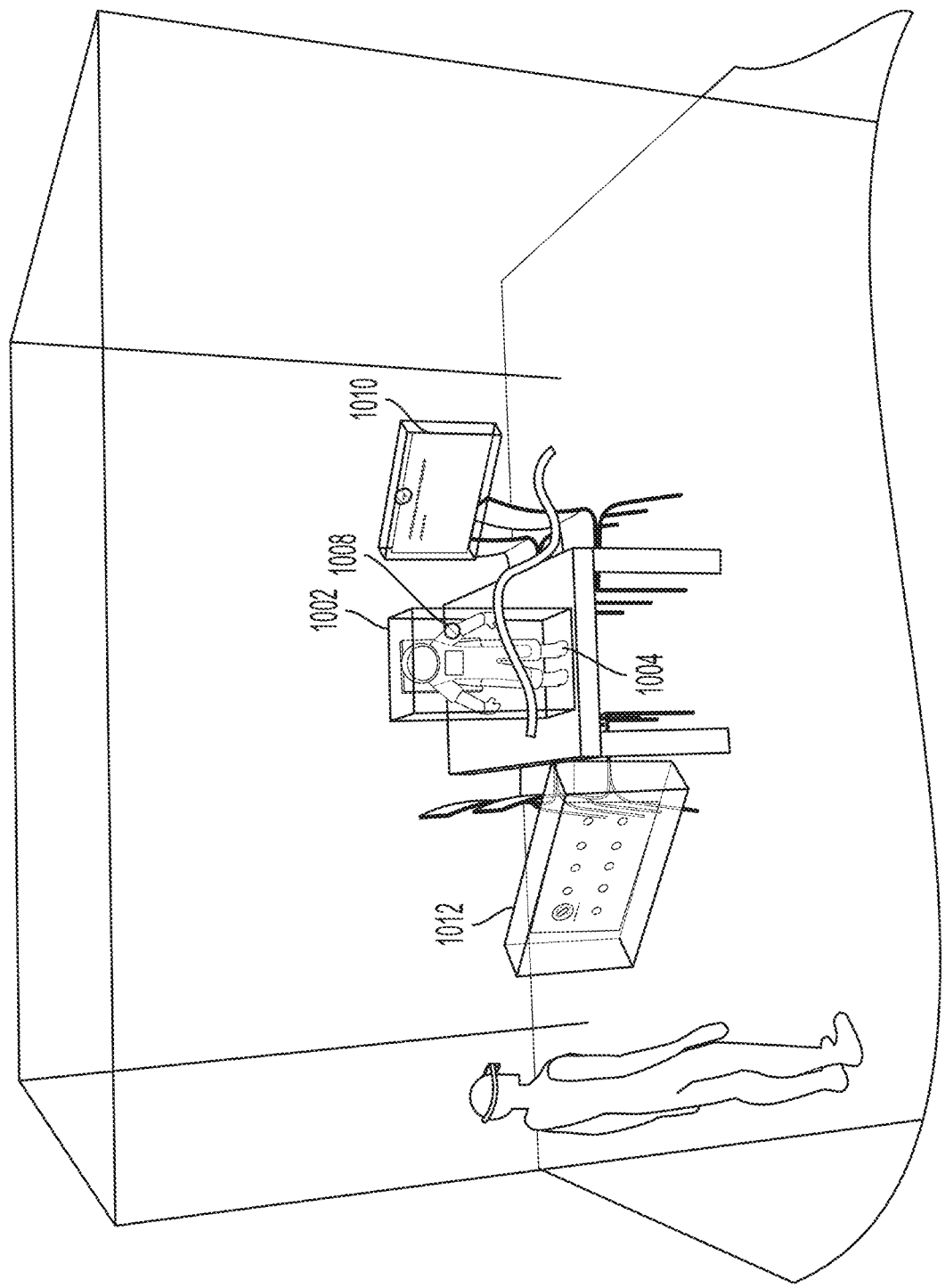
FIG. 10 illustrates an example of mixed reality annotation, according to some embodiments.

FIG. 10 illustrates an example of mixed reality annotation, according to some embodiments. In some embodiments, virtual object 1002 may be a prism and may include one or more virtual objects within it (e.g., virtual object 1004). In some embodiments, a prism may include a bounding volume and/or parameters of included virtual objects. In some embodiments, virtual object 1012 can include a prism which may include an annotation menu (which can correspond to annotation menu 908). In some embodiments, virtual object 1012 may not intersect with prism 1002 (e.g., because object 1004 may obscure a view of annotation menu 1012, which may prevent the user from interacting with annotation menu 1012).

In some embodiments, a user may select location indicator 1008, which may be displayed on and/or near virtual objects 1002 and/or 1004. In some embodiments, selecting location indicator 1008 may cause virtual object 1010 to be displayed to a user. Virtual object 1010 can include a prism, which may include a virtual comment bubble. In some embodiments, virtual object 1010 can be displayed near location indicator 1008. In some embodiments, virtual object 1010 may not intersect with virtual object 1002 (e.g., because it may obscure a view of a virtual comment bubble). In some embodiments, virtual objects 1012 and/or 1010 may continually face a user as a user moves around an environment. In some embodiments, virtual objects 1012 and/or 1010 may reposition themselves if their view becomes obstructed (e.g., if a user moves such that virtual object 1002 obstructs a view from the user to virtual object 1010).

Figure 11:
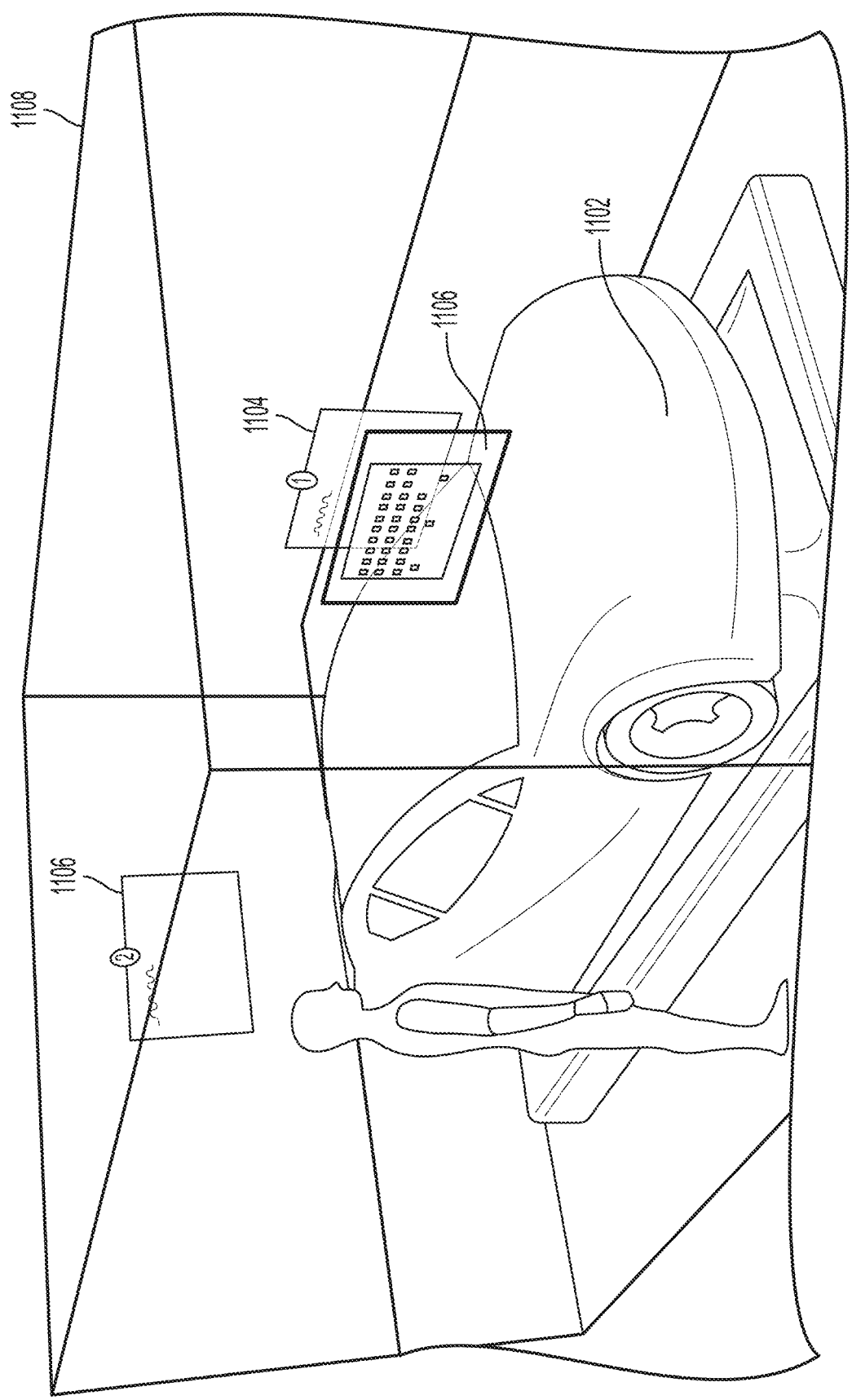
FIG. 11 illustrates an example of mixed reality annotation, according to some embodiments.

FIG. 11 illustrates an example of mixed reality annotation, according to some embodiments. In some embodiments, virtual object 1108 (which may include a prism) can be very large (e.g., because an included virtual object 1102 is very large). In some embodiments, virtual object 1104 may be displayed within another virtual object (e.g., virtual object 1108). For example, virtual object 1108 may include a bounding prism of virtual object 1102, but because of the size of virtual object 1102, significant space may exist where virtual object 1102 does not obstruct vision of other virtual objects. In some embodiments, virtual object 1104 can include a virtual comment bubble, which a user may enter text into. In some embodiments, virtual keyboard 1106 may be displayed as a user edits a virtual comment bubble. In some embodiments, virtual keyboard 1106 may be displayed in proximity to a corresponding virtual comment bubble. For example, a user may edit comment bubble 1104, and virtual keyboard 1106 may be displayed near bubble 1104 (instead of, for example, comment bubble 1106). It can be beneficial to visually indicate which virtual comment bubble a user is editing (e.g., by displaying a keyboard near the corresponding comment bubble).

Example systems, methods, and computer-readable media are disclosed. According to some examples, a system comprises a wearable device comprising a transmissive display; one or more processors configured to execute a method comprising: presenting a virtual object to a first user at a first position via the transmissive display of the wearable device; receiving a first input from the first user; in response to receiving the first input, presenting a virtual annotation at a first displacement from the first position via the transmissive display; transmitting first data to a second user, the first data associated with the virtual annotation and the first displacement; receiving a second input from the second user; in response to receiving the second input, presenting the virtual annotation to the first user at a second displacement from the first position via the transmissive display; and transmitting second data to a remote server, the second data associated with the virtual object, the virtual annotation, the second displacement, and the first position. In some examples, the virtual object is presented based on a first application configured to run on the wearable device, and the virtual annotation is presented based on data from a plugin library, the plugin library configured to be accessed by multiple applications configured to run on the wearable device. In some examples, the second data is transmitted at a first time, and the method further comprises: exiting a session instance, wherein the session instance is configured to store the second data; receiving a third input from the first user; in response to receiving the third input, requesting the second data; presenting the virtual object at the first position to the first user at a second time later than the first time; and presenting the virtual annotation at the second displacement from the first position to the first user at the second time. In some examples, the annotation comprises a virtual markup. In some examples, the virtual object is presented at a first size, the virtual object comprises target dimension data, and the method further comprises: receiving a third input from the first user; in response to receiving the third input, presenting the virtual object at a second size to the first user, wherein the second size is associated with the target dimension data; and transmitting third data to the second user, the third data associated with the second size. In some examples, the method further comprises: receiving a third input from the first user; in response to receiving the third input, presenting the virtual location indicator to the first user, wherein the virtual location indicator is associated with a virtual comment; and transmitting third data to the second user, the third data associated with the virtual location indicator. In some examples, the method further comprises: presenting a virtual annotation menu to the first user via the transmissive display; and repositioning the virtual annotation menu such that the virtual annotation menu is not occluded by the virtual object.

According to some examples, a method comprises presenting a virtual object to a first user at a first position via a transmissive display of a wearable device; receiving a first input from the first user; in response to receiving the first input, presenting a virtual annotation at a first displacement from the first position via the transmissive display; transmitting first data to a second user, the first data associated with the virtual annotation and the first displacement; receiving a second input from the second user; in response to receiving the second input, presenting the virtual annotation to the first user at a second displacement from the first position via the transmissive display; and transmitting second data to a remote server, the second data associated with the virtual object, the virtual annotation, the second displacement, and the first position. In some examples, the virtual object is presented based on a first application configured to run on the wearable device, and the virtual annotation is presented based on data from a plugin library, the plugin library configured to be accessed by multiple applications configured to run on the wearable device. In some examples, the second data is transmitted at a first time, and the method further comprises: exiting a session instance, wherein the session instance is configured to store the second data; receiving a third input from the first user; in response to receiving the third input, requesting the second data; presenting the virtual object at the first position to the first user at a second time later than the first time; and presenting the virtual annotation at the second displacement from the first position to the first user at the second time. In some examples, the annotation comprises a virtual markup. In some examples, the virtual object is presented at a first size, the virtual object comprises target dimension data, and the method further comprises: receiving a third input from the first user; in response to receiving the third input, presenting the virtual object at a second size to the first user, wherein the second size is associated with the target dimension data; and transmitting third data to the second user, the third data associated with the second size. In some examples, the method further comprises: receiving a third input from the first user; in response to receiving the third input, presenting the virtual location indicator to the first user, wherein the virtual location indicator is associated with a virtual comment; and transmitting third data to the second user, the third data associated with the virtual location indicator. In some examples, the method further comprises: presenting a virtual annotation menu to the first user via the transmissive display; and repositioning the virtual annotation menu such that the virtual annotation menu is not occluded by the virtual object.

According to some examples, a non-transitory computer-readable medium stores instructions that, when executed by one or more processors, cause the one or more processors to execute a method comprising: presenting a virtual object to a first user at a first position via a transmissive display of a wearable device; receiving a first input from the first user; in response to receiving the first input, presenting a virtual annotation at a first displacement from the first position via the transmissive display; transmitting a first data to a second user, the first data associated with the virtual annotation and the first displacement; receiving a second input from the second user; in response to receiving the second input, presenting the virtual annotation to the first user at a second displacement from the first position via the transmissive display; and transmitting second data to a remote server, the second data associated with the virtual object, the virtual annotation, the second displacement, and the first position. In some examples, the virtual object is presented based on a first application configured to run on the wearable device, and the virtual annotation is presented based on data from a plugin library, the plugin library configured to be accessed by multiple applications configured to run on the wearable device. In some examples, the second data is transmitted at a first time, and the method further comprises: exiting a session instance, wherein the session instance is configured to store the second data; receiving a third input from the first user; in response to receiving the third input, requesting the second data; presenting the virtual object at the first position to the first user at a second time later than the first time; and presenting the virtual annotation at the second displacement from the first position to the first user at the second time. In some examples, the annotation comprises a virtual markup. In some examples, the virtual object is presented at a first size, the virtual object comprises target dimension data, and the method further comprises: receiving a third input from the first user; in response to receiving the third input, presenting the virtual object at a second size to the first user, wherein the second size is associated with the target dimension data; and transmitting third data to the second user, the third data associated with the second size. In some examples, the method further comprises: receiving a third input from the first user; in response to receiving the third input, presenting the virtual location indicator to the first user, wherein the virtual location indicator is associated with a virtual comment; and transmitting third data to the second user, the third data associated with the virtual location indicator. In some examples, the method further comprises: presenting a virtual annotation menu to the first user via the transmissive display; and repositioning the virtual annotation menu such that the virtual annotation menu is not occluded by the virtual object.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A system comprising:
a wearable device comprising a transmissive display; and
one or more processors configured to execute a method comprising:
presenting a virtual object to a user at a first position via the transmissive display of the wearable device;
at a first time, receiving a first input from the user;
in response to receiving the first input, presenting a virtual annotation at a first displacement from the first position via the transmissive display;
transmitting first data to a remote server, the first data associated with the virtual object, the virtual annotation, and the first displacement;
at a second time later than the first time, receiving a second input from the user;
in response to receiving the second input, presenting the virtual annotation to the user at a second displacement from the first position via the transmissive display, the second displacement different from the first displacement; and
transmitting second data to the remote server, the second data associated with the virtual object, the virtual annotation, and the second displacement, wherein:
receiving the first input from the user comprises receiving the first input via a first annotation menu dynamically presented to the user at the first time at a fixed orientation relative to an orientation of the user at the first time, and
receiving the second input from the user comprises receiving the second input via a second annotation menu dynamically presented to the user at the second time at a fixed orientation relative to an orientation of the user at the second time.

2. The system of claim 1, wherein presenting the virtual object comprises presenting the virtual object based on a first application configured to run on the wearable device, and wherein presenting the virtual annotation comprises presenting the virtual annotation based on data from a plugin library, the plugin library configured to be accessed by multiple applications configured to run on the wearable device.

3. The system of claim 1, wherein the method further comprises exiting a session instance, the session instance configured to store the second data.

4. The system of claim 1, wherein the method further comprises, concurrently with presenting the virtual annotation to the user, presenting a second virtual annotation to the user, wherein the second virtual annotation comprises data received from a second user via the remote server.

5. The system of claim 1, wherein presenting the virtual object comprises presenting the virtual object at a first size, wherein the virtual object comprises target dimension data, and wherein the method further comprises:
at a third time later than the second time, receiving a third input from the user;
in response to receiving the third input, presenting the virtual object at a second size to the user, wherein the second size is associated with the target dimension data; and
transmitting third data to the remote server, the third data associated with the second size.

6. The system of claim 1, the method further comprising:
at a third time later than the second time, receiving a third input from the user;
in response to receiving the third input, presenting a virtual location indicator to the user, wherein the virtual location indicator is associated with a virtual comment; and
transmitting third data to the remote server, the third data associated with the virtual location indicator.

7. The system of claim 1, wherein the method further comprises:
receiving an indication to present the first annotation menu to the user via the transmissive display;
determining whether a view of the first annotation menu is occluded by the virtual object; and
in response to determining that the view of the first annotation menu is occluded by the virtual object, repositioning the first annotation menu such that the first annotation menu is not occluded by the virtual object.

8. A method comprising:
presenting a virtual object to a user at a first position via a transmissive display of a wearable device;
at a first time, receiving a first input from the user;
in response to receiving the first input, presenting a virtual annotation at a first displacement from the first position via the transmissive display;
transmitting first data to a remote server, the first data associated with the virtual object, the virtual annotation, and the first displacement;
at a second time later than the first time, receiving a second input from the user;
in response to receiving the second input, presenting the virtual annotation to the user at a second displacement from the first position via the transmissive display, the second displacement different from the first displacement; and
transmitting second data to the remote server, the second data associated with the virtual object, the virtual annotation, and the second displacement, wherein:
receiving the first input from the user comprises receiving the first input via a first annotation menu dynamically presented to the user at the first time at a fixed orientation relative to an orientation of the user at the first time, and
receiving the second input from the user comprises receiving the second input via a second annotation menu dynamically presented to the user at the second time at a fixed orientation relative to an orientation of the user at the second time.

9. The method of claim 8, wherein the virtual object is presented based on a first application configured to run on the wearable device, and wherein the virtual annotation is presented based on data from a plugin library, the plugin library configured to be accessed by multiple applications configured to run on the wearable device.

10. The method of claim 8, further comprising exiting a session instance, the session instance configured to store the second data.

11. The method of claim 8, further comprising: concurrently with presenting the virtual annotation to the user, presenting a second virtual annotation to the user, wherein the second virtual annotation comprises data received from a second user via the remote server.

12. The method of claim 8, wherein presenting the virtual object comprises presenting the virtual object at a first size, wherein the virtual object comprises target dimension data, and wherein the method further comprises:
at a third time later than the second time, receiving a third input from the user;
in response to receiving the third input, presenting the virtual object at a second size to the user, wherein the second size is associated with the target dimension data; and
transmitting third data to the remote server, the third data associated with the second size.

13. The method of claim 8, further comprising:
at a third time later than the second time, receiving a third input from the user;
in response to receiving the third input, presenting a virtual location indicator to the user, wherein the virtual location indicator is associated with a virtual comment; and
transmitting third data to the remote server, the third data associated with the virtual location indicator.

14. The method of claim 8, further comprising:
receiving an indication to present the first annotation menu to the user via the transmissive display;
determining whether a view of the first annotation menu is occluded by the virtual object; and
in response to determining that the view of the first annotation menu is occluded by the virtual object, repositioning the first annotation menu such that the first annotation menu is not occluded by the virtual object.

15. A non-transitory computer-readable medium storing instructions that, when executed by one or more processors, cause the one or more processors to execute a method comprising:
presenting a virtual object to a user at a first position via a transmissive display of a wearable device;
at a first time, receiving a first input from the user;
in response to receiving the first input, presenting a virtual annotation at a first displacement from the first position via the transmissive display;
transmitting first data to a remote server, the first data associated with the virtual object, the virtual annotation, and the first displacement;
at a second time later than the first time, receiving a second input from the user;
in response to receiving the second input, presenting the virtual annotation to the user at a second displacement from the first position via the transmissive display, the second displacement different from the first displacement; and
transmitting second data to the remote server, the second data associated with the virtual object, the virtual annotation, and the second displacement,
wherein:
receiving the first input from the user comprises receiving the first input via a first annotation menu dynamically presented to the user at the first time at a fixed orientation relative to an orientation of the user at the first time, and
receiving the second input from the user comprises receiving the second input via a second annotation menu dynamically presented to the user at the second time at a fixed orientation relative to an orientation of the user at the second time.

16. The non-transitory computer-readable medium of claim 15, wherein the virtual object is presented based on a first application configured to run on the wearable device, and wherein the virtual annotation is presented based on data from a plugin library, the plugin library configured to be accessed by multiple applications configured to run on the wearable device.

17. The non-transitory computer-readable medium of claim 15, the method further comprising: concurrently with presenting the virtual annotation to the user, presenting a second virtual annotation to the user, wherein the second virtual annotation comprises data received from a second user via the remote server.

18. The non-transitory computer-readable medium of claim 15, wherein presenting the virtual object comprises presenting the virtual object at a first size, wherein the virtual object comprises target dimension data, and wherein the method further comprises:
at a third time later than the second time, receiving a third input from the user;
in response to receiving the third input, presenting the virtual object at a second size to the user, wherein the second size is associated with the target dimension data; and transmitting third data to the remote server, the third data associated with the second size.

19. The non-transitory computer-readable medium of claim 15, the method further comprising:
at a third time later than the second time, receiving a third input from the user;
in response to receiving the third input, presenting a virtual location indicator to the user, wherein the virtual location indicator is associated with a virtual comment; and
transmitting third data to the remote server, the third data associated with the virtual location indicator.

20. The non-transitory computer-readable medium of claim 15, the method further comprising:
receiving an indication to present the first annotation menu to the user via the transmissive display;
determining whether a view of the first annotation menu is occluded by the virtual object; and
in response to determining that the view of the first annotation menu is occluded by the virtual object, repositioning the first annotation menu such that the first annotation menu is not occluded by the virtual object.

\* \* \* \* \*